US009031410B2

(12) United States Patent
Shimoosako et al.

(10) Patent No.: US 9,031,410 B2
(45) Date of Patent: May 12, 2015

(54) CUSTOMER PREMISES OPTICAL NETWORK UNIT AND OPTICAL TRANSMISSION SYSTEM

(71) Applicant: Furukawa Electric Co., Ltd., Tokyo (JP)

(72) Inventors: Kazutaka Shimoosako, Tokyo (JP); Kunio Odaka, Tokyo (JP); Katsuya Aboshi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 128 days.

(21) Appl. No.: 13/787,589

(22) Filed: Mar. 6, 2013

(65) Prior Publication Data

US 2013/0183038 A1 Jul. 18, 2013

Related U.S. Application Data

(62) Division of application No. 12/601,823, filed as application No. PCT/JP2008/054348 on Mar. 11, 2008, now Pat. No. 8,417,119.

(30) Foreign Application Priority Data

May 29, 2007 (JP) ................................. 2007-141509
Sep. 4, 2007 (JP) ................................. 2007-228966

(51) Int. Cl.
*H04J 14/00* (2006.01)
*H04B 10/40* (2013.01)
*H04Q 11/00* (2006.01)

(52) U.S. Cl.
CPC ........... *H04B 10/40* (2013.01); *H04Q 11/0067* (2013.01); *H04Q 2011/0064* (2013.01); *H04Q 2011/0084* (2013.01)

(58) Field of Classification Search
CPC .... H04B 10/40; H04B 10/271; H04B 10/272; H04B 10/275; H04B 10/2755; H04B 10/278; H04B 10/43; H04J 14/023; H04J 14/0231; H04J 14/0234; H04J 14/0236; H04J 14/0238; H04J 14/0239; H04J 14/0242; H04J 14/0245; H04J 14/0249; H04J 14/0252; H04J 14/0258; H04J 14/0278; H04J 14/0279; H04J 14/028; H04J 14/0282; H04J 14/0284; H04J 14/0286; H04Q 2011/0064; H04Q 2011/0084; H04Q 2011/0088; H04Q 11/0067
USPC ........... 398/135, 138, 139, 66, 68, 70, 71, 72, 398/58, 128, 130
See application file for complete search history.

(56) References Cited

U.S. PATENT DOCUMENTS 7,978,984 B2 7/2011 Shinohara
8,059,961 B2 * 11/2011 Shimoosako et al. .......... 398/66
(Continued)

FOREIGN PATENT DOCUMENTS

CN 1269945 10/2000
CN 1311569 9/2001
(Continued)

OTHER PUBLICATIONS

International Search Report mailed May 1, 2008 for PCT Application Serial No. PCT/JP2008/054348, 2 pages.
(Continued)

*Primary Examiner* — M. R. Sedighian
(74) *Attorney, Agent, or Firm* — Amin, Turocy & Watson, LLP

(57) ABSTRACT

An optical network unit according to the present invention is provided as comprising a configuration that component units built therein are grouped for at least two sheets of substrate modules and arranged thereat. There are provided individual embodiments: (a) arranging an L2 layer and a part of the component unit of an L1 layer at a first substrate module, meanwhile, arranging the left part of the component unit of the L1 layer at a second substrate module; (b) arranging the component units of the L1 layer and of the L2 layer at the first substrate module and the second substrate module individually by grouping therefor; and (c) arranging the component units of the L2 layer and of the L1 layer at the first substrate module and the second substrate module respectively.

6 Claims, 37 Drawing Sheets

(56) References Cited

U.S. PATENT DOCUMENTS

| | | | |
|---|---|---|---|
| 8,412,041 B2* | 4/2013 | Aboshi et al. | 398/66 |
| 2003/0123493 A1* | 7/2003 | Takahashi | 370/539 |
| 2005/0031347 A1* | 2/2005 | Soto et al. | 398/58 |

FOREIGN PATENT DOCUMENTS

| | | | |
|---|---|---|---|
| JP | 09214541 A | 8/1997 | |
| JP | 2001-298217 | 10/2001 | |
| JP | 2002-281058 | 9/2002 | |
| JP | 2002290425 A | 10/2002 | |
| JP | 2002300121 A | 10/2002 | |
| JP | 2003188919 A | 7/2003 | |
| JP | 2004-32541 | 1/2004 | |
| JP | 2005-57766 | 3/2005 | |
| JP | 2005-269474 | 9/2005 | |
| JP | 4898812 B2 | 3/2012 | |
| JP | 4903812 B2 | 3/2012 | |

OTHER PUBLICATIONS

Written Opinion of the ISA mailed May 29, 2007 for PCT Application Serial No. PCT/JP2008/054348, 3 pages.

OA dated Aug. 3, 2012 for U.S. Appl. No. 12/601,823, 15 pages.

* cited by examiner

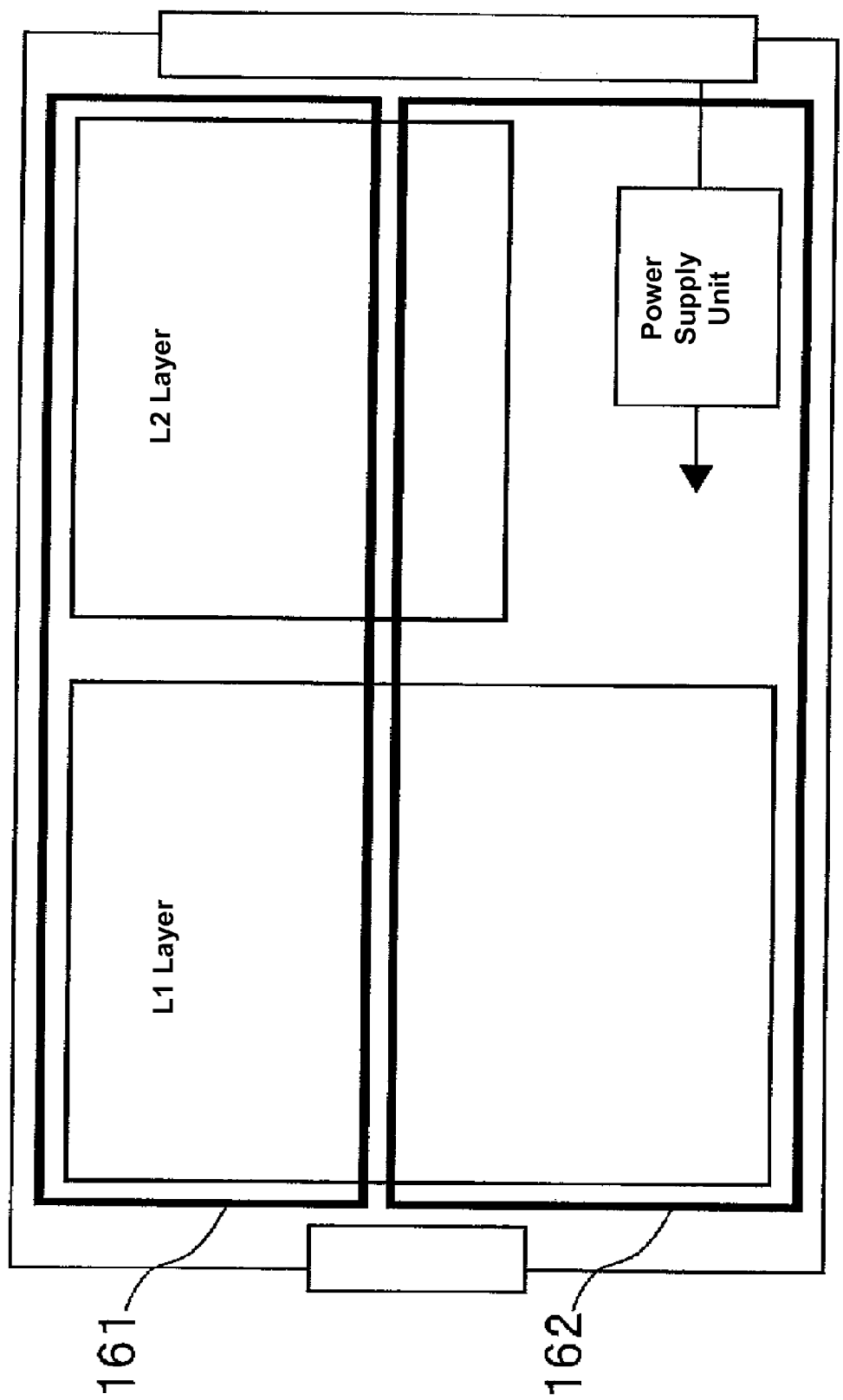

CUSTOMER PREMISES OPTICAL NETWORK UNIT AND OPTICAL TRANSMISSION SYSTEM

CROSS-REFERENCE TO RELATED APPLICATIONS

This application is divisional application of U.S. patent application Ser. No. 12/601,823, filed Mar. 29, 2010, which is a US national stage filing of patent cooperation treaty (PCT) Appln. No. PCT/JP2008/054348 (WO 2008/146517), filed Mar. 11, 2008, which claims priority to Japanese patent application No. 2007-228966, filed on Sep. 4, 2007 and to Japanese patent application No. 2007-141509, filed on May 29, 2007, and the entire contents of each of the foregoing applications are incorporated herein by reference.

TECHNICAL FIELD

The present invention relates to a customer premises optical network unit and an optical transmission system. More specifically, it relates to the optical network unit comprising a multi source agreement interface module or an original interface module connected with an end terminal of an optical transmission path at the customer premises side, and to the optical transmission system comprising such the optical network unit.

BACKGROUND ART

Regarding an optical network, such as a fiber to the home (FTTH), a cable television (CATV), or the like, as disclosed in a patent document 1 as mentioned below, there is used an optical transmission system of passive optical network (PON) type, in which an optical transmission path to be connected with a central office is split by a passive splitter and then constructed for a plurality of customer premises. Such the optical transmission system is called as a passive double star (PDS) as well.

Regarding such the optical transmission system of PON type, as shown in FIG. 19, a splitter 903 is connected with an optical fiber 902 for a user side extended from an optical line termination (OLT) 901 at a central office. Moreover, optical network units (ONU) 905-1 to 905-n (n: natural number; hereinafter, simply referred to as an ONU 905) in a customer premises are connected with a plurality of optical transmission paths split by the splitter 903 to be as optical fibers 904-1 to 904-n (n: natural number; hereinafter, simply referred to as an optical fiber 904).

Moreover, the ONU 905 comprises an optical transceiver unit 910, an ONU function part 920 and a physical layer (PHY)/transform unit 930, and then it is installed indoors to be used. Further, an optical connector 910a is provided at the optical transceiver unit 910 as a connection part at a central office side thereof, and then the optical fiber 904 is connected with the optical connector 910a, which is led into the indoors from outdoor.

While, at a connection side for a peripheral device or the like of the ONU 905, there is provided a local area network (LAN) connector 933 at the PHY/transform unit 930 as an Ethernet (the registered trade name) interface, such as the 10 BASE-TX, the 100 BASE-TX, the 1000 BASE-TX, or the like, and then a LAN cable 934 is connected thereto for example. Moreover, for such the LAN cable 934, a LAN device (an external node) 950, such as a router, a switching hub, or the like, is connected thereto. Or, it may be also available to connect a peripheral device 960, such as a computer or the like, directly to the LAN cable 934. In a case where the LAN device 950 is connected therewith, the peripheral device 960, such as the computer, a printer, or the like, is further connected thereto.

Next, a detailed block diagram of the ONU 905 is shown in FIG. 20. The ONU function part 920 comprises an ONU LSI 921, a flash memory 922 and a synchronous static random access memory (RAM) (the synchronous SRAM) 923. And then the ONU LSI 921 is connected to the optical transceiver unit 910.

Moreover, the PHY/transform unit 930 as the Ethernet (the registered trade name) interface comprises a physical layer (PHY) 931, a transformer 932 and the LAN connector 933. Further, the PHY 931 is connected with a media independent interface (MII) (not shown in figures) of the ONU LSI 921, the transformer 932 is connected with the PHY 931, and then the LAN connector 933 is connected with the transformer 932. Furthermore, as a power supply to be used in the ONU 905 inside, there are provided a power connector 941 and a power supply circuit 942, and then from the power supply circuit 942, a power is supplied to individual component units.

Thus, it is normal for the conventional ONU 905 that has a structure comprising a connection interface to a general LAN cable, an interface for an AC 100V commercial power source, an optical fiber interface and an optical fiber storing part. Here, one example of a general board configuration regarding the conventional ONU 905 is shown in FIG. 21. Moreover, one example of an outside dimension regarding the conventional ONU 905 is shown in FIG. 22. Such the conventional ONU 905 is arranged for all of the above mentioned individual component units thereof on one sheet of a substrate module (board). And then the optical transceiver unit 910 has a structure that an optical transceiver module 910b of a main body thereof and the optical connector 910a are connected therebetween using an optical fiber cord 910c. Hence, according to the conventional ONU, the ONU 905 becomes to be a relatively large equipment with being configured using a single body package as shown in FIG. 22, because all of such the function parts as above mentioned are arranged on the one sheet of the board.

Each example of connecting a LAN device 950 with the conventional ONU 905 is shown in FIG. 23 and FIG. 24. In FIG. 23, there is shown an example that the LAN device 950, such as a compact broad band router or the like, is connected with the ONU 905 via the LAN cable 934. While, in FIG. 24, there is shown an example that a medium size or a small size L2 or L3 LAN switch device, or the LAN device 950, such as the router or the like, is connected with the ONU 905 via the LAN cable 934 as well. Moreover, the optical fiber 904, the LAN cable 934, and a power cable 943 provided with an AC adapter 944 are connected with the ONU 905 for both of the examples.

Moreover, the ONU function part 920 has a function to perform a media access control for the OLT 901 and the external node 950 as being pursuant to the IEEE 802.3ah. Further, as grouping based on a reference model of the open systems interconnection (OSI) instituted by the International Organization for Standardization (ISO), the optical transceiver unit 910 and the PHY/transform unit 930 become to be a physical layer (referred to as an L1 layer hereinafter), and the ONU function part 920 becomes to be a data link layer (referred to as an L2 layer hereinafter). Still further, as redrawing the block diagram of the ONU 905 as shown in FIG. 20 to be a block diagram for every layer according to the reference model of the OSI, it becomes able to be as shown in FIG. 25. Still further, the ONU 905 comprises a component unit of L1 layer and a component unit of L2 layer, and then such the component units are arranged on one sheet of a board, as shown in the similar figure.

Still further, one example that the external node 950 is connected to the ONU 905 via the LAN cable 934 is shown in FIG. 35. FIG. 35 is a diagrammatic perspective view of the ONU 905 and the external node 950. Here, a LED 950a provided at the external node 950 is turned on when a communication is established between the ONU 905 and the external node 950. That is to say, there is provided the LED at the external node, such as a conventional LAN switch or the like, for notifying whether a communication is established for the OLT at the central office via the ONU, and then it is set to be turned on when the communication is established therebetween. Furthermore, there is provided an LED 905a at the ONU 905 of desk top type as shown in FIG. 35, and then it indicates a communication possible state by turning it on when the communication is established for the OLT 901.

[Patent Document 1] Japanese Patent Application Publication No. H09(1997)-214541

DISCLOSURE OF THE INVENTION

Problem to be Solved by the Invention

However, according to the above mentioned conventional customer premises optical network unit (ONU) and the optical transmission system using therewith, there are problems as described below. That is, according to a conventional general ONU, an L1 layer and an L2 layer are complicatedly connected therebetween on one sheet of a board inside thereof. And then a required area of the board becomes so large that it becomes hard to design a smaller size packaging therefor. Hence, it is used as the single body device comprising the relatively large package, as shown in FIG. 22. And then other device is connected thereto, with using such as an optical fiber, a LAN cable, or the like. Hence, it becomes required a relatively larger space to install such the ONU. Moreover, there is a further problem that the total system becomes complicated due to increasing thereby excessive component devices, such as cables and the like therefor.

Further, in a case of connecting a plurality of peripheral devices, such as the personal computers or the like, to the conventional ONU, it is annoyed that first the ONU is connected with an end terminal of an optical transmission path, next a LAN cable is used for connecting between the ONU and a LAN device, such as a router, switching hub, or the like, and then another LAN cable is used for connecting between the LAN device and the individual peripheral devices. In addition thereto, it becomes required to arrange a power supply device (an AC adapter or the like) for supplying a power to the ONU, and to wire a power cable or the like. As a result, there are existed a plurality of the equipment devices and of the cables between the ONU and the individual peripheral devices, as exemplary shown in FIG. 23 and FIG. 24.

Thus, there is the problem according to the conventional ONU that it is required to ensure a device installation space therefor and a wiring space to be sufficiently wide. Moreover, there is another problem that a reliability of a whole hardware component cannot help but be decreased, due to using an external equipment device, such as the power supply device for the ONU, the power cable therefor, or the like. Further, a power consumption becomes to be a larger value as approximately between six and seven watt, due to supplying the power using the AC adapter. Hence, there is a problem that a total cost is increased, and then there becomes a problem that such the case is not desired from a view point of the energy saving, according to a consideration of an increase of the number of customers for the FTTH in recent years as well.

Here, the present invention has been made to overcome such the problems, and it is an object of the present invention to provide a customer premises optical network unit that it is able to design a smaller size packaging and to connect easily between an optical transmission path and a plurality of peripheral devices, and also to design a higher reliability, a space saving and a lower power consumption with becoming unnecessary to use the single purpose power supply device and the cable therefor, and to provide an optical transmission system comprising such the optical network unit.

Means for Solving the Problem

A first aspect of a customer premises optical network unit according to the present invention for solving the above mentioned problems is characterized in that the customer premises optical network unit comprises: an optical transceiver unit to be connected with an optical transmission path at a central office side for performing an opto-electrical transform and an inverse opto-electrical transform; an optical network unit function part to be connected with an electric signal input and output terminal of the optical transceiver unit; a serial/parallel transform unit to be connected with a parallel signal terminal of the optical network unit function part for performing a serial/parallel transform and an inverse serial/parallel transform; and a multi source agreement interface module to be connected with a serial signal terminal of the serial/parallel transform unit, wherein the optical transceiver unit, the optical network unit function part, the serial/parallel transform unit and the multi source agreement interface module are mounted on any one of not less than two sheets of substrate modules.

Another aspect of the customer premises optical network unit according to the present invention is characterized in that the multi source agreement interface module is any one module of a giga bit interface converter, a small form factor pluggable and a small form factor pluggable plus.

Another aspect of the customer premises optical network unit according to the present invention is characterized in that the optical network unit function part comprises a communication logic unit, and the optical transceiver unit and the communication logic unit are individually mounted on different substrate modules.

Another aspect of the customer premises optical network unit according to the present invention is characterized in that the optical transceiver unit comprises an optical sub-assembly wherein a main amplifier is built thereinto.

A first aspect of an optical transmission system according to the present invention is characterized in that an optical transmission system comprises: said customer premises optical network unit according to any one of the above mentioned first to the fourth aspects; an optical line terminal to be provided at a central office; an optical multiplexing and demultiplexing part comprising a port for the customer premises side and a port for the central office side; a first optical transmission path for connecting between the customer premises optical network unit and the port for the customer premises side; and a second optical transmission path for connecting between the optical line terminal and the port for the central office side.

Another aspect of the optical transmission system according to the present invention is characterized in that said multi source agreement interface module is inserted directly into and connected with a multi source agreement interface slot of an external node arranged externally therefrom.

Another aspect of the optical transmission system according to the present invention is characterized in that the external node is a local area network switch comprising a plurality of ports.

A second aspect of a customer premises optical network unit according to the present invention is characterized in that the customer premises optical network unit for connecting an external node at a customer premises side to an optical transmission path connected with a central office, which comprises: an optical transceiver unit to be connected with the optical transmission path for performing an opto-electrical transform and an inverse opto-electrical transform; an optical network unit function part to be connected with an electric signal input and output terminal of the optical transceiver unit; a serial/parallel transform unit to be connected with a parallel signal terminal of the optical network unit function part for performing a serial/parallel transform and an inverse serial/parallel transform; a multi source agreement interface module to be connected with a serial signal terminal of the serial/parallel transform unit; an indication unit for performing a predetermined indication at a time of inputting an indication request signal from the optical network unit function part; and a package for storing the optical transceiver unit, the optical network unit function part, the serial/parallel transform unit, the multi source agreement interface module and the indication unit, wherein a visual check part is provided at the package for visual checking the indication unit.

Another aspect of the customer premises optical network unit according to the present invention is characterized in that the package is premised of an insertion part to be inserted into a predetermined slot of the external node and of an exposed part to be exposed outside thereof and comprising an optical connector, and the visual check part is provided at the exposed part.

Another aspect of the customer premises optical network unit according to the present invention is characterized in that the visual check part is light pass ditches of not less than one provided at an inner wall of the exposed part to be viewable from the optical connector side.

Another aspect of the customer premises optical network unit according to the present invention is characterized in that the visual check part is through holes of not less than one provided at a side wall of the exposed part.

Another aspect of the customer premises optical network unit according to the present invention is characterized in that the visual check part is through holes of not less than one provided at an upper surface of the exposed part.

Another aspect of the customer premises optical network unit according to the present invention is characterized in that the indication unit is lamp indicators of not less than one mounted on a similar substrate for the optical network unit function part.

Another aspect of the customer premises optical network unit according to the present invention is characterized in that the indication unit is lamp indicators of not less than one mounted on another substrate electrically connected with the optical network unit function part.

Another aspect of the customer premises optical network unit according to the present invention is characterized in that the multi source agreement interface module is a small form factor pluggable module.

Another aspect of the customer premises optical network unit according to the present invention is characterized in that the indication request signal is signals of not less than one to be determined a communication condition for between the central office at the optical network unit function part and then to be output therefrom.

Another aspect of the customer premises optical network unit according to the present invention is characterized in that the indication request signal includes a signal to be determined a communication condition regarding at least an optical signal detection and then to be output therefrom.

Another aspect of the customer premises optical network unit according to the present invention is characterized in that the indication request signal includes a signal to be determined a communication condition regarding at least a passive optical network link between the central office and then to be output therefrom.

Another aspect of the customer premises optical network unit according to the present invention is characterized in that the indication request signal includes a signal to be determined a communication condition regarding at least an authentication and then to be output therefrom.

Effects of the Invention

According to the customer premises optical network unit regarding the first aspect of the present invention, because of mounting the individual component units to be grouped for at least two sheets of the substrate modules, it becomes able to design the smaller size packaging and to connect easily between the optical transmission path and a plurality of the peripheral devices, and also to design the higher reliability, the space saving and the lower power consumption with becoming unnecessary to use the single purpose power supply device and the cable therefor.

Moreover, according to the customer premises optical network unit regarding the second aspect of the present invention, because of providing the indication unit for notifying the communication state to the customer premises optical network unit of SFP standard, it becomes possible to recognize easily a communication error for between the OLT.

BRIEF DESCRIPTION OF THE DRAWINGS

FIGS. 1A, 1B and 1C are pattern diagrams showing a configuration of a substrate module regarding an ONU according to the present invention.

DESCRIPTION OF THE REFERENCE SYMBOLS

1 OPTICAL TRANSMISSION SYSTEM
10 PON INTERFACE CARD
11 OLT
12 AUTHENTICATION FUNCTION PART
20, 40 OPTICAL FIBER
30 SPLITTER
50 ONU
60 EXTERNAL NODE
60a MSA INTERFACE SLOT
61 EXTERNAL NODE MAC UNIT
62 LED
70 PERIPHERAL DEVICE
80 LAN CABLE
101 PON INTERFACE CARD
101a, 901 OLT
105, 905 ONU
106 EXTERNAL NODE
106a SFP I/F SLOT
107 PERIPHERAL DEVICE
110, 910 OPTICAL TRANSCEIVER UNIT
111 OPTICAL CONNECTOR UNIT
114 TIA
115 LIM AMP
118 OSA
120, 920 ONU FUNCTION PART
121, 921 ONU LSI
130 SERIAL/PARALLEL TRANSFORM UNIT
140 SFP I/F
150, 942 POWER SUPPLY CIRCUIT
161, 261 MAIN BOARD
162, 262 SUB BOARD
163 SFP PACKAGE
164, 264 SC CONNECTOR PART
400, 500, 600, 700 ONU
410 OPTICAL TRANSCEIVER UNIT
411 OPTICAL CONNECTOR UNIT
420 ONU FUNCTION PART
421 FIRST MAC UNIT
422 SECOND MAC UNIT
423 MANAGEMENT INTERFACE
430 SERIAL/PARALLEL TRANSFORM UNIT
440 MSA INTERFACE MODULE
480, 580, 680, 780 PACKAGE
481, 581, 681, 781 INSERTION PART
482, 582, 682, 782 EXPOSED PART
491 FIRST SUBSTRATE
492 SECOND SUBSTRATE
493 CONNECTOR FOR CONNECTION BETWEEN BOARDS
494, 594, 694, 794 LED
495, 595 LIGHT PASS DITCH
695, 795 THROUGH HOLE
930 PHY/TRANSFORM UNIT
931 PHY
932 TRANSFORMER
941 POWER CONNECTOR
943 POWER CABLE
944 AC ADAPTER

BEST MODE FOR CARRYING OUT THE INVENTION

A customer premises optical network unit and an optical transmission system according to each of embodiments regarding the present invention will be described in detail below, based on the drawings.

Figure 2:
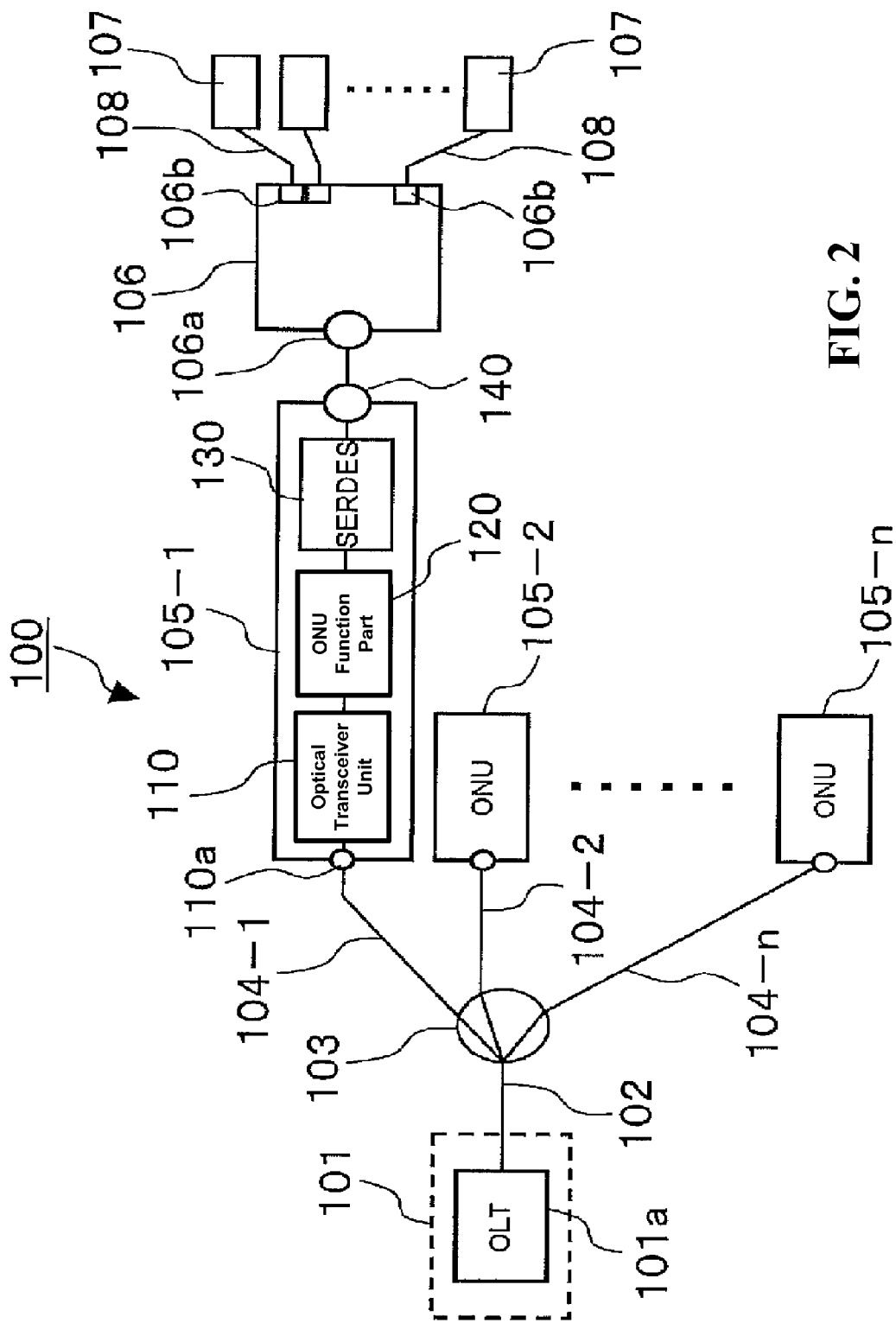
FIG. 2 is a configuration diagram showing a configuration of an optical transmission system of PON type according to the first embodiment.

FIG. 2 is a configuration diagram showing a configuration of an optical transmission system 100 of PON type according to the first embodiment regarding the present invention.

According to the optical transmission system 100 as shown in FIG. 2, there is provided an optical line termination (OLT) 101a on a PON interface card 101 provided at a central office, and one end of an optical fiber 102 as a second optical transmission path is connected with an optical input and output terminal of the OLT 101a. Moreover, for another end of the optical fiber 102, that is to say, for a customer premises side, an optical coupler (optical multiplexing and de-multiplexing part) 103 is connected therewith.

Further, a plurality of a first optical transmission paths are connected from the optical coupler 103 to the customer premises side, and then each of those are configured using optical fibers 104-1 to 104-n (n: natural number; simply referred to as an optical fiber 104 hereinafter) respectively. Still further, the optical fiber 102 and the optical fiber 104 are connected using the optical coupler 103, an optical signal is multiplexed and de-multiplexed thereat, and then it is transmitted therefrom. Furthermore, for one end at the customer premises side for each of the optical fibers 104, a customer premises optical network unit (ONU) 105-1 to 105-n (n: natural number; simply referred to as an optical fiber (a customer premises optical network unit (ONU) 105 hereinafter) are connected therewith respectively.

Regarding the OLT 101a at the central office, at a time of connecting with the ONU 105, a signal is exchanged with the ONU 105 for determining whether or not a predetermined condition is satisfied. And then an establishment of a data link is determined as normal in a case where it is satisfactory. Hereby a PON link becomes to be an established state between the OLT 101a and the ONU 105.

For the OLT 101 and the ONU 105, a device is used, which suits a regulation of a gigabit passive optical network (GPON; a method to be pursuant to the ITU standard G.984.x), or of a gigabit Ethernet (the registered trade name) PON (GEPON; a method to be pursuant to the IEEE 802.3ah standard). Moreover, according to the OSI reference model, an establishment of a PON link corresponds to a link establishment of the L2 layer. For example, in a case where a system of the OLT 101a and the ONU 105 is the GEPON, the establishment of the PON therefor becomes to be pursuant to the procedure of the IEEE 802.3ah standard.

For at least one of the ONUs 105, an ONU 105 in which a multi source agreement (MSA) interface module is adopted. Moreover, for the MSA interface module, there is a module, such as a giga bit interface converter (GBIC), a small form factor pluggable (SFP), or the like. Further, the GBIC module is the module to be connected with network devices (L2 and L3 LAN switches) corresponding to the gigabit Ethernet (the registered trade name), and it is the dismountable module to be possible for a transmission of a fiber channel and a gigabit Ethernet (the registered trade name) physical layer. Furthermore, the SFP is the module having a smaller package size than that of the GBIC module.

Figure 3:
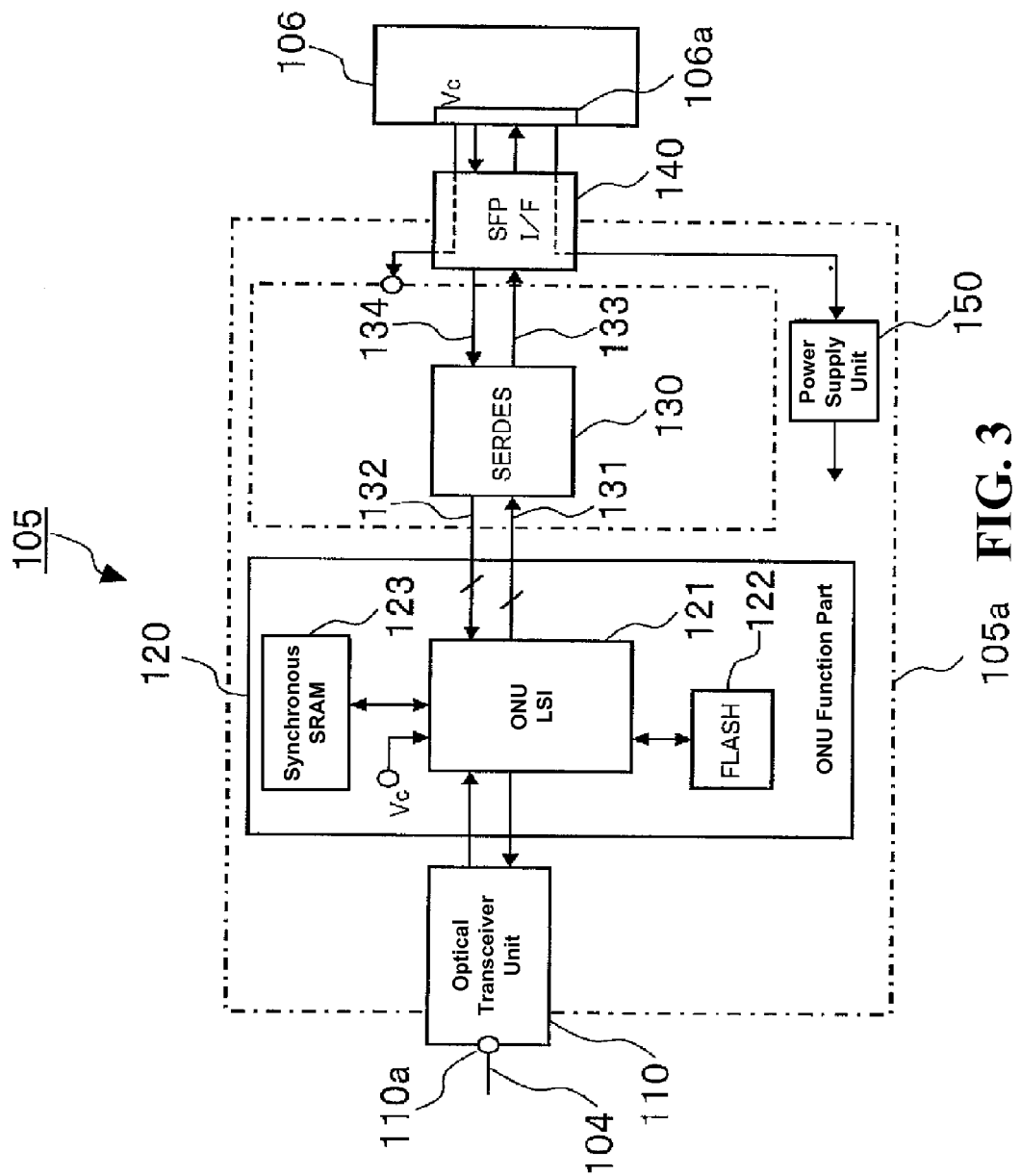
FIG. 3 is a block diagram showing a detailed configuration of an ONU according to the first embodiment.

According to the present embodiment, a case where the SFP standard is adopted as one example for the MSA interface module will be described in detail below. A block diagram showing a detailed configuration of an ONU 105 for which the SFP standard is adopted is shown in FIG. 3. As shown in the figure, the ONU 105 comprises an optical transceiver unit 110, an optical network unit function part (ONU function part) 120, a serial/parallel transform unit or a serializer/deserializer (SERDES) 130, an SFP interface module (SFP I/F) 140, and a package 105a for storing those.

According to the present embodiment, the SFP interface module 140 for connecting the ONU 105 to the peripheral device is configured for being able to insert directly into and then connect to an SFP interface slot 106a provided at an external node 106 so as to be pursuant to the SFP standard. Here, the external node 106 means a LAN device, such as the L2 LAN switch, the L3 LAN switch, a router, or the like.

Moreover, the L2 LAN switch and the L3 LAN switch are network relay devices for performing a data transfer. In a case where the external node 106 is the L2 LAN switch, a destination of a packet is determined which is based on a data of a data link layer (the L2 layer) of the OSI reference model, and then a data transfer is performed thereby. Further, in a case where the external node 106 is the L3 LAN switch, a destination of a packet is determined which is based on a data of a network layer (the L3 layer) of the OSI reference model, and then a data transfer is performed thereby.

Still further, for the external node 106 to which the SFP interface module 140 is connected, a plurality of ports 106b are provided thereat as shown in FIG. 2. Furthermore, a peripheral device 107, such as a personal computer or the like, is connected to the individual ports 106b via a LAN cable 108.

Figure 4:
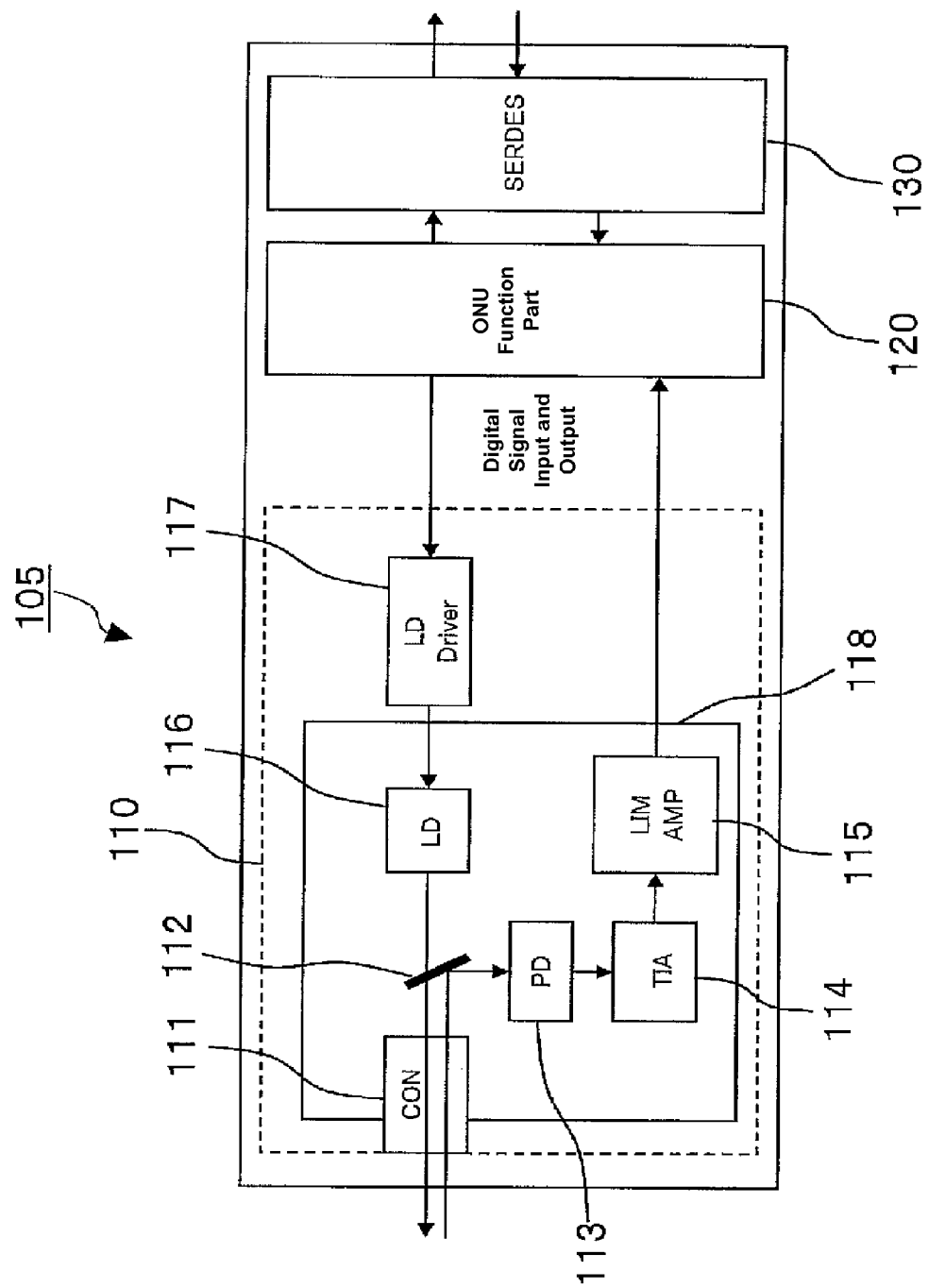
FIG. 4 is a detailed configuration diagram of an optical transceiver unit according to the first embodiment.

Next, a configuration of the optical transceiver unit 110 will be described in detail below using FIG. 4. FIG. 4 is a detailed configuration diagram of the optical transceiver unit 110. The optical transceiver unit 110 comprises an optical connector unit (CON) 111 for connecting with the optical fiber 104 at the central office side. Moreover, it comprises a photo detecting unit (PD) 113 to input an optical signal from the optical connector unit 111 thereinto by branching at an optical filter unit 112 for signal transforming from the optical signal to an electric signal, a trans impedance amplifier (TIA) 114 as a preamplifier for taking out a weak electric signal by amplifying such the electric signal output from the photo detecting unit 113, and a limiting amplifier (LIM AMP) 115 as a main amplifier for further amplifying the electric signal from the TIA 114 and then for outputting it as a general purpose digital signal to the ONU function part 120.

Further, it comprises a laser diode (LD) 116 to generate an optical signal according to an electric signal from the ONU function part 120, and an LD driver 117 to operate the LD 116, for signal transforming from the electric signal to the optical signal, wherein the optical signal output from the LD 116 is branched at the filter unit 112, it is further output to the optical connector unit 111, and then it is transmitted to the optical fiber 104 therefrom. Still further, among the above mentioned component units built in the optical transceiver unit 110, the component units except the LD driver 117 are built in an optical sub assembly (OSA) 118, and in particular it is characterized in that the LIM AMP 115 is built in the OSA 118.

Still further, the ONU function part 120 is an electric circuit as shown in FIG. 3, which comprises an ONU LSI 121 as a large scale integration (LSI) device (communication logic unit) for PON processing to be connected with the optical transceiver unit 110, and a flash memory 122 and a synchronous SRAM 123 connected to the ONU LSI 121. Furthermore, for the flash memory 122, a program is written therein. Here, a media access control (MAC) address is written in the flash memory 122 or a read only memory (ROM) which is not shown in the figures.

Figure 5:
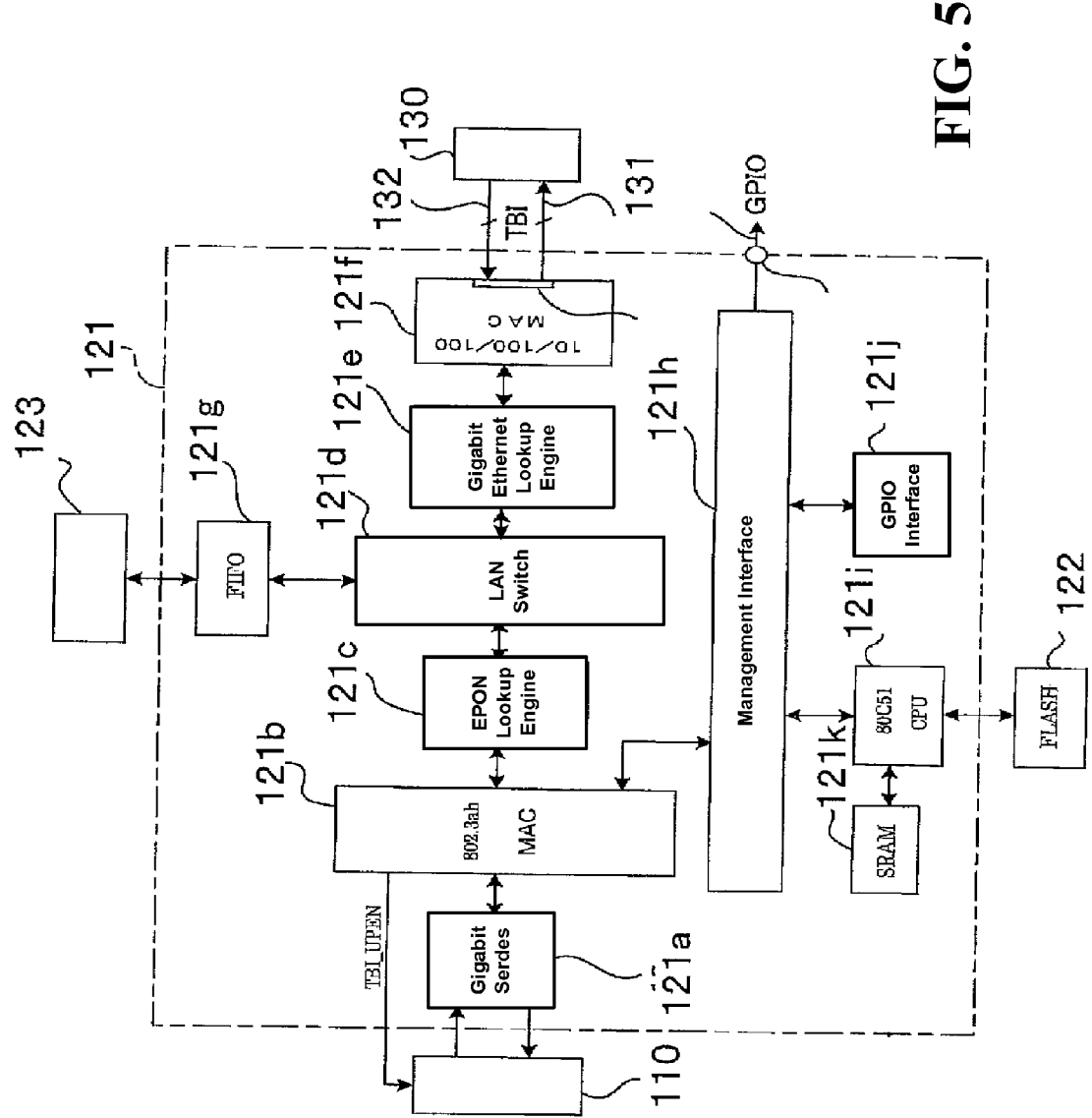
FIG. 5 is a detailed configuration diagram of an ONU LSI according to the first embodiment.

Next, a detailed configuration regarding the ONU LSI 121 is shown in FIG. 5. Here, the ONU LSI 121 comprises an MAC unit 121b which is to be connected with an electric signal input and output terminal of the optical transceiver unit 110 (or an output side of the LIM AMP 115), via a gigabit serializer/deserializer (SERDES) 121a. Moreover, the MAC unit 121b has a function to perform a media access control to be pursuant to the IEEE 802.3ah. Further, the MAC unit 121b is connected with a 10/100/1000 MAC interface 121f via an Ethernet (the registered trade name) passive optical network (EPON) lookup engine 121c, a LAN switch 121d, and then a gigabit Ethernet (the registered trade name) passive optical network (EPON) lookup engine 121e. Still further, for the LAN switch 121d, a first-in first-out (FIFO) 121g is connected therewith for being connected with the synchronous SRAM 123 as well.

Still further, for the MAC unit 121b, an 80C51 CPU 121i and a general purpose input/output (GPIO) interface 121j are connected therewith via a management interface 121h. Furthermore, for the 80C51 CPU 121i, an SRAM 121k and the flash memory 122 are connected therewith. For such the ONU LSI 121 comprising the above mentioned configuration, there is a chip which is pursuant to an EPON from Teknovus Inc. for example.

Next, the serial/parallel transform unit 130 is connected with the ONU LSI 121 using a ten bit interface (TBI) comprising an input wiring 131 and an output wiring 132 as parallel signal terminals as shown in FIG. 3, meanwhile, it is connected with the SFP I/F 140 via an output wiring 133 and an input wiring 134 as serial signal terminals.

Regarding a power supply to be used in the ONU 105 inside, there is provided a power supply circuit 150. And then it becomes a configuration that the power is supplied from the external node 106 to the power supply circuit 150 via a predetermined pin provided at the SFP I/F 140, and then the power is further supplied therefrom to the individual component units.

Figure 6:
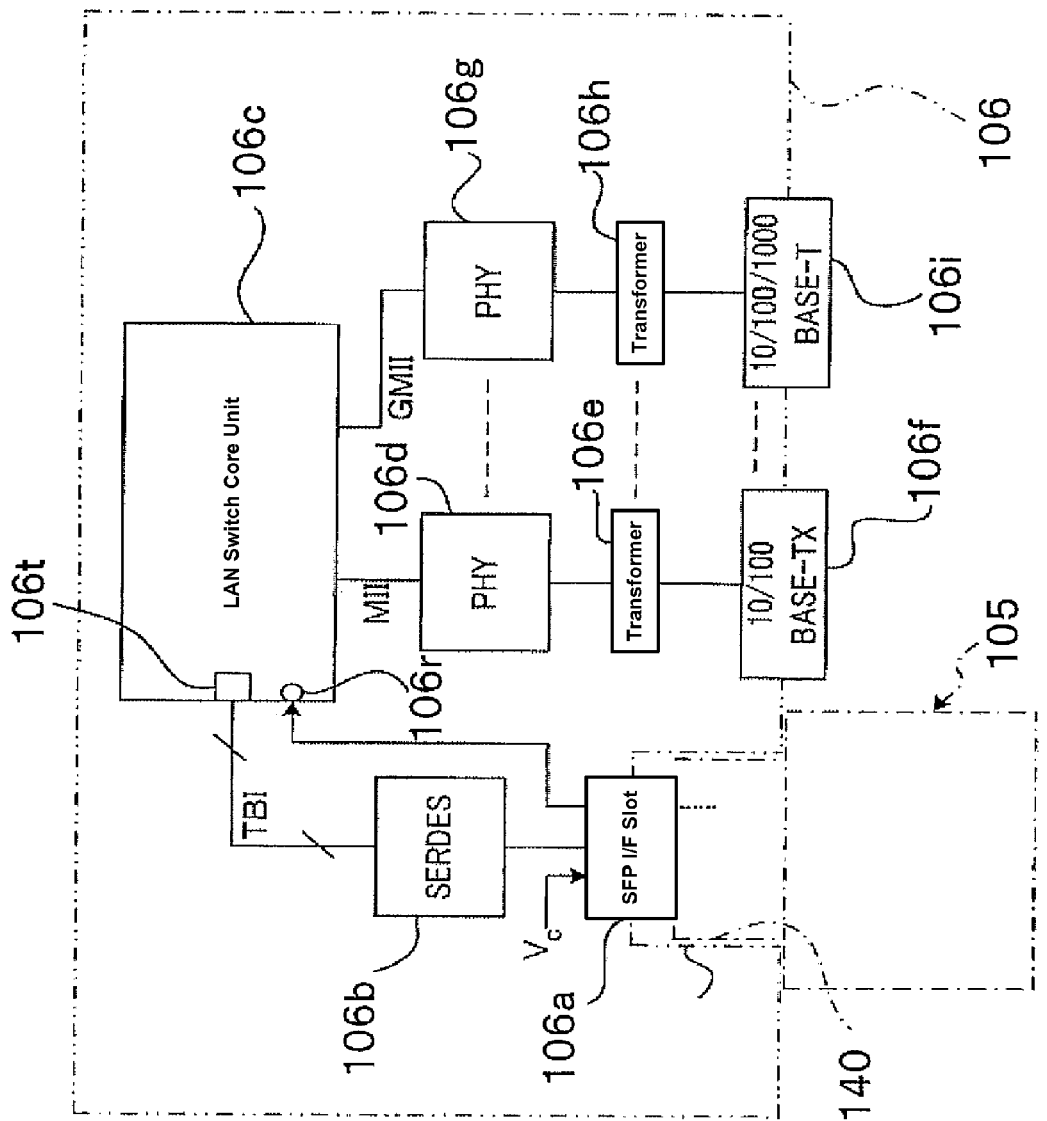
FIG. 6 is a configuration diagram of the L3 Ethernet (the registered trade name) LAN switch.

Here, the external node 106 comprises an MSA interface slot 106a for the SFP I/F as the MSA interface module to be pluggable thereinto. As one example, there is an L3 Ethernet (the registered trade name) LAN switch having a configuration as shown in FIG. 6. Such the MSA interface slot (the SFP I/F slot for example) 106a to be comprised by the L3 Ethernet (the registered trade name) LAN switch is connected to a TBI terminal 106t on a LAN switch core unit 106c via the serial/parallel transform unit (SERDES) 106b. Moreover, on the LAN switch core unit 106c, there is provided a terminal 106r to be connected for the RX-LOSS signal. Further, the LAN switch core unit 106c is comprised of an IC device.

Still further, for a media independent interface (MII) on an MAC layer in the LAN switch core unit 106c, a PHY 106d, a transformer 106e, and a connector 106f pursuant to the 10/100 BASE-TX standard are connected therewith. Still further, for a gigabit MII (GMII) on the MAC layer in the LAN switch core unit 106c, a PHY 106g, a transformer 106h, and a connector 106i pursuant to the 10/100/1000 BASE-T standard are connected therewith. And then for the connector 106f and 106i, a LAN cable is connected thereto.

Furthermore, the MSA interface slot 106a comprises a pin (not shown in the figures) for outputting a voltage (Vc) to be applied from an internal power supply unit (not shown in the figures). And then the power is supplied to the power supply circuit 150 in the ONU 105 inside via such the pin.

According to the ONU regarding the present invention, there is provided a configuration that the component units built therein are grouped for at least two sheets of substrate modules. And then because it is able to group the individual component units built therein into the L1 layer and the L2 layer of the OSI reference model, in a case of grouping into two sheets of the substrate modules and of arranging therefor, any one of three embodiments as shown in FIG. 1 is selected and then arranged therefor. Here, (a) as shown in FIG. 1A shows an embodiment that the component unit of the L2 layer and a part of the component unit of the L1 layer are arranged at a first substrate module (referred to as a main board unit hereinafter) 161, meanwhile, the left part of the component unit of the L1 layer is arranged at a second substrate module (referred to as a sub board unit hereinafter) 162.

Moreover, FIG. 1B shows another embodiment that a part of the component unit of the L1 layer and a part of the component unit of the L2 layer are arranged at the main board unit 161, meanwhile, the left parts of the component units of the L1 layer and of the L2 layer are arranged at the sub board unit 162. Further, FIG. 1C shows another embodiment that the component unit of the L2 layer is arranged at the main board unit 161, meanwhile, the component unit of the L1 layer is arranged at the sub board unit 162. Still further, it may be also available to arrange in an opposite way regarding the component units of the L1 layer and the L2 layer for the substrate modules.

Figure 1A:
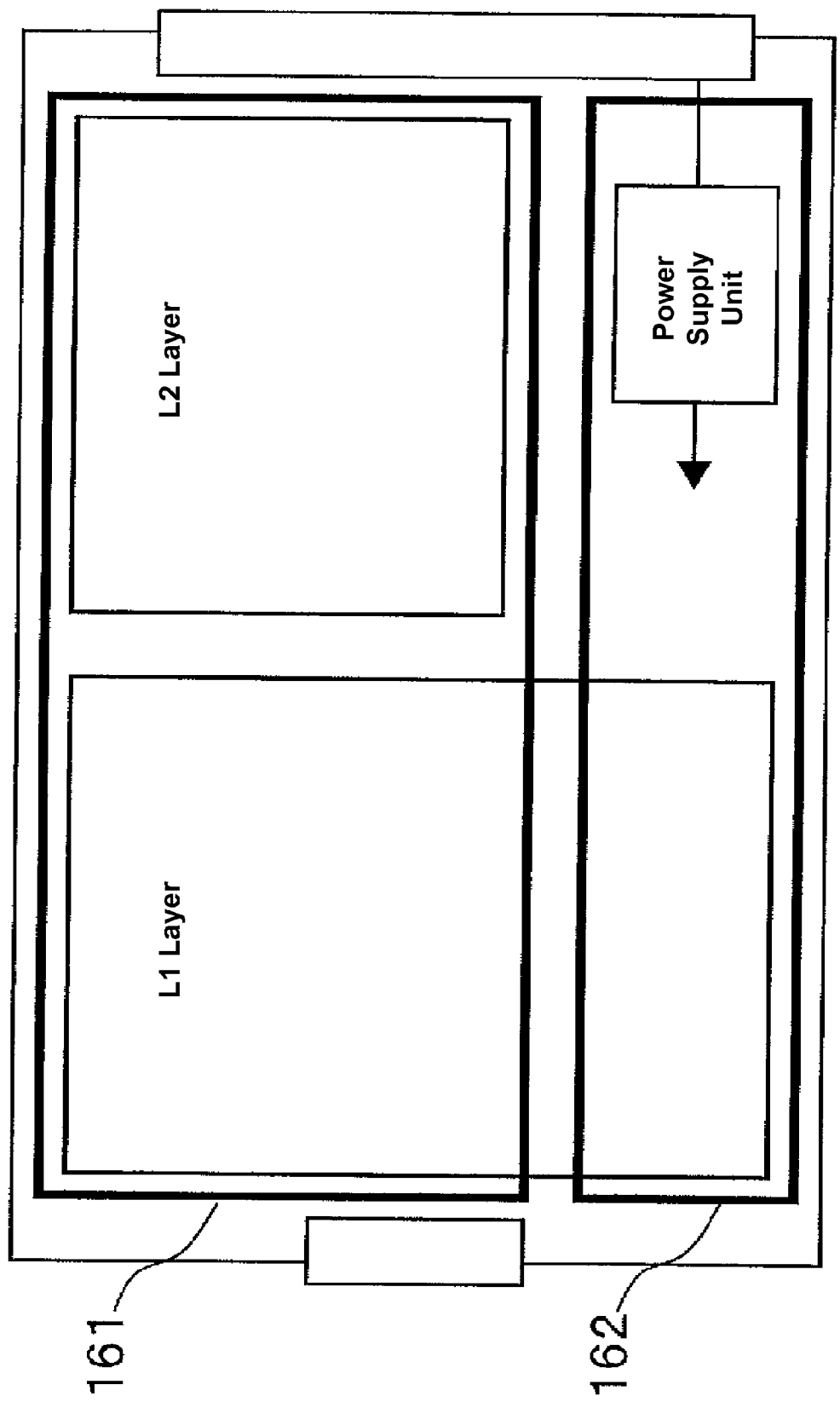
Figure 1C:
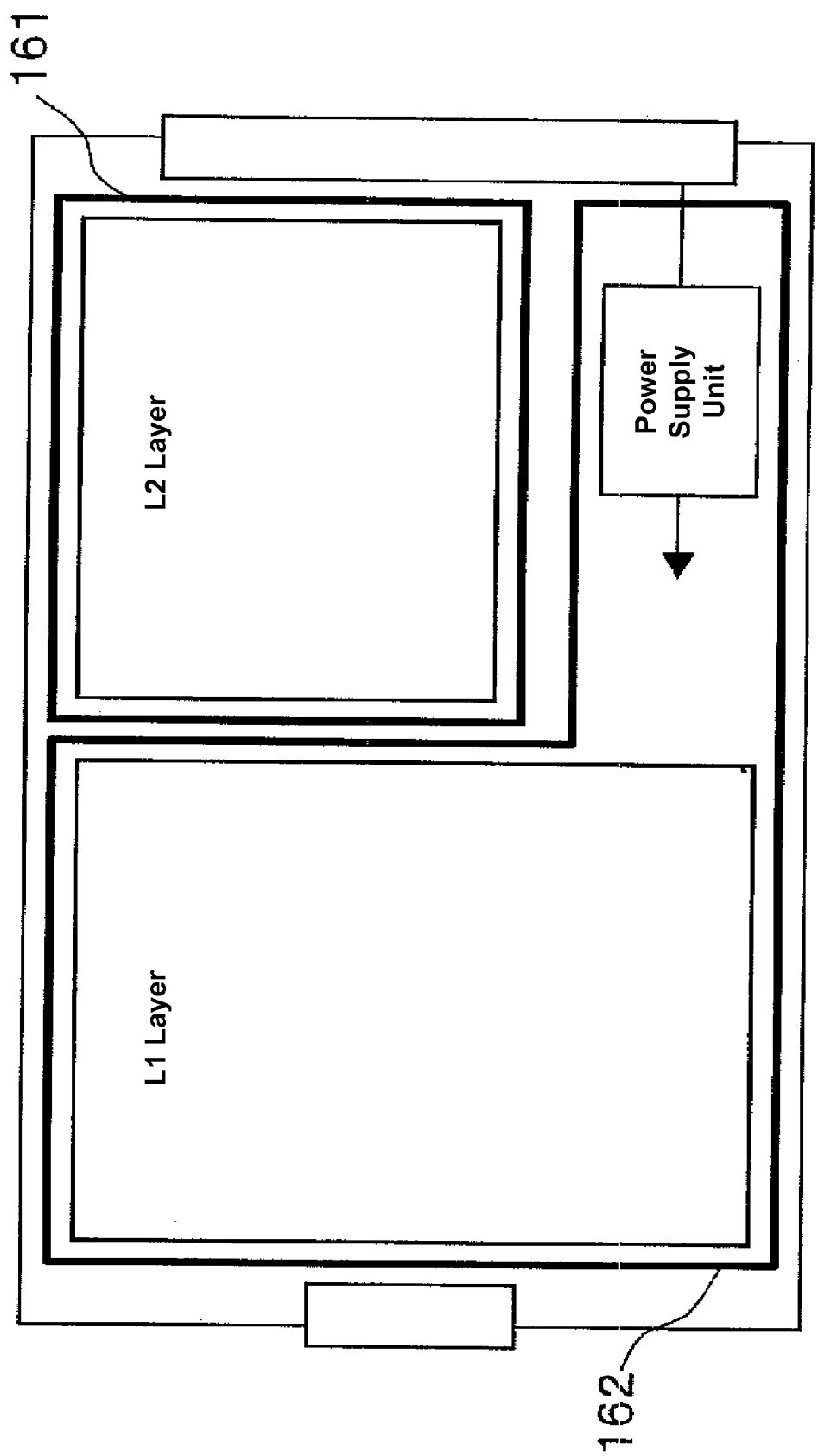

According to FIG. 1, there is shown a case where the component units built in the ONU are grouped for two sheets of the substrate modules and then arranged therefor. However, it is also possible for those to be grouped for not less than three sheets of substrate modules and then arranged therefor. As one example, it is able to mount on another substrate module regarding the component unit of the L1 layer or the component unit of the L2 layer to be arranged at the main board 161 in FIG. 1(a). Moreover, it is able to arrange for example the component unit of the L1 layer or the power supply unit at another substrate module regarding the component units to be arranged at the sub board 162. Thus, it becomes able to design the substrate modules to be as three sheets or four sheets, or also able to add more than that. As similar thereto regarding FIGS. 1(b) and (c), it is able to arrange therefor at substrates of not less than three sheets by adding any substrate modules thereto.

Figure 7:
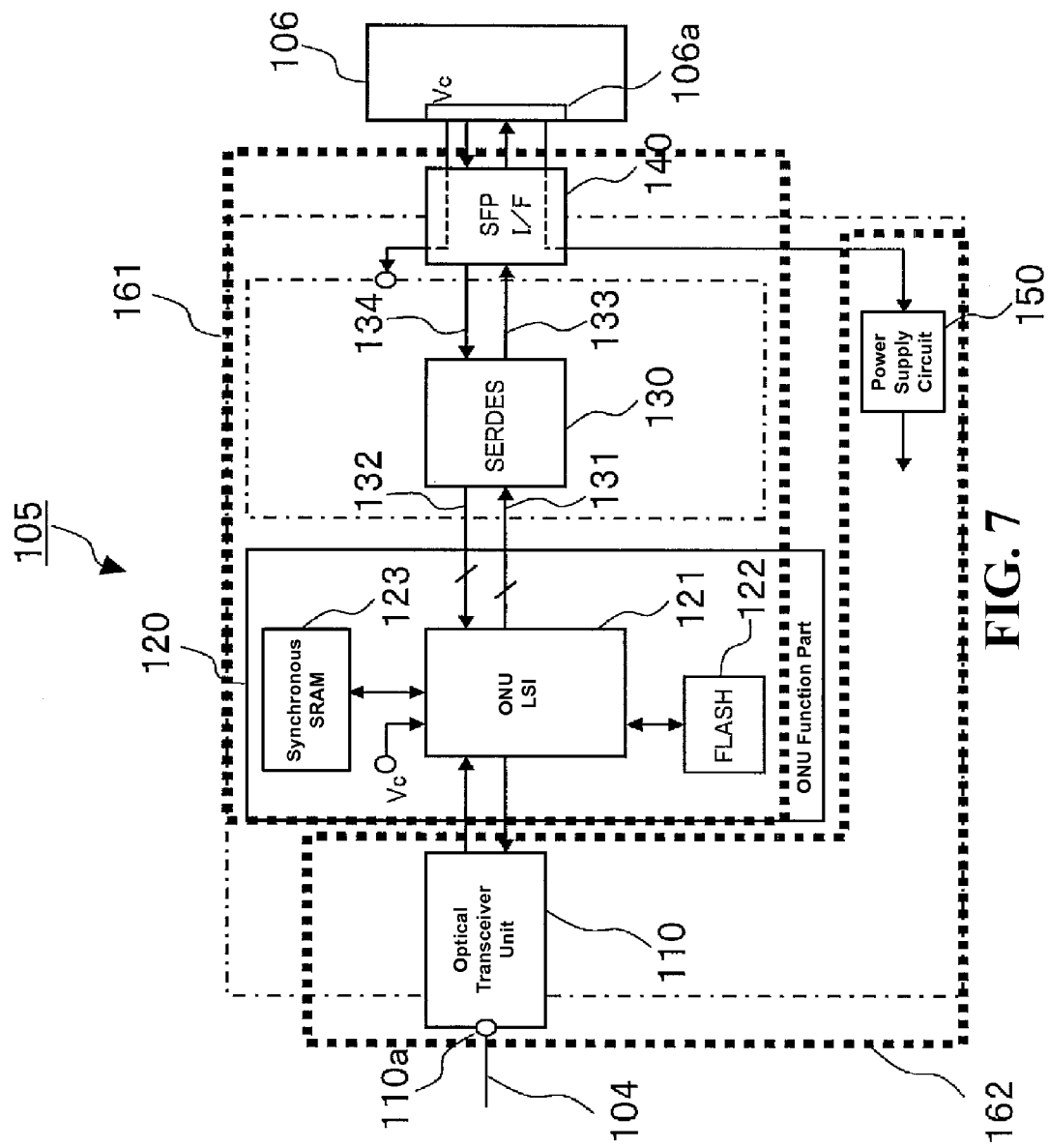
FIG. 7 is a block diagram showing one example of individual component units of an ONU according to the first embodiment to be grouped for a main board and a sub board.

According to the ONU 105 regarding the first embodiment, the substrate module configuration of the embodiment as shown in FIG. 1(a) is adopted, wherein the optical transceiver unit 110 is mounted on the sub board 162 and the ONU LSI 121 as the communication logic unit is mounted on the main board 161. Here, one example of the individual component units of the ONU 105 as shown in FIG. 3 to be grouped for the main board 161 and the sub board 162 and then to be arranged is shown in FIG. 7.

Figure 8:
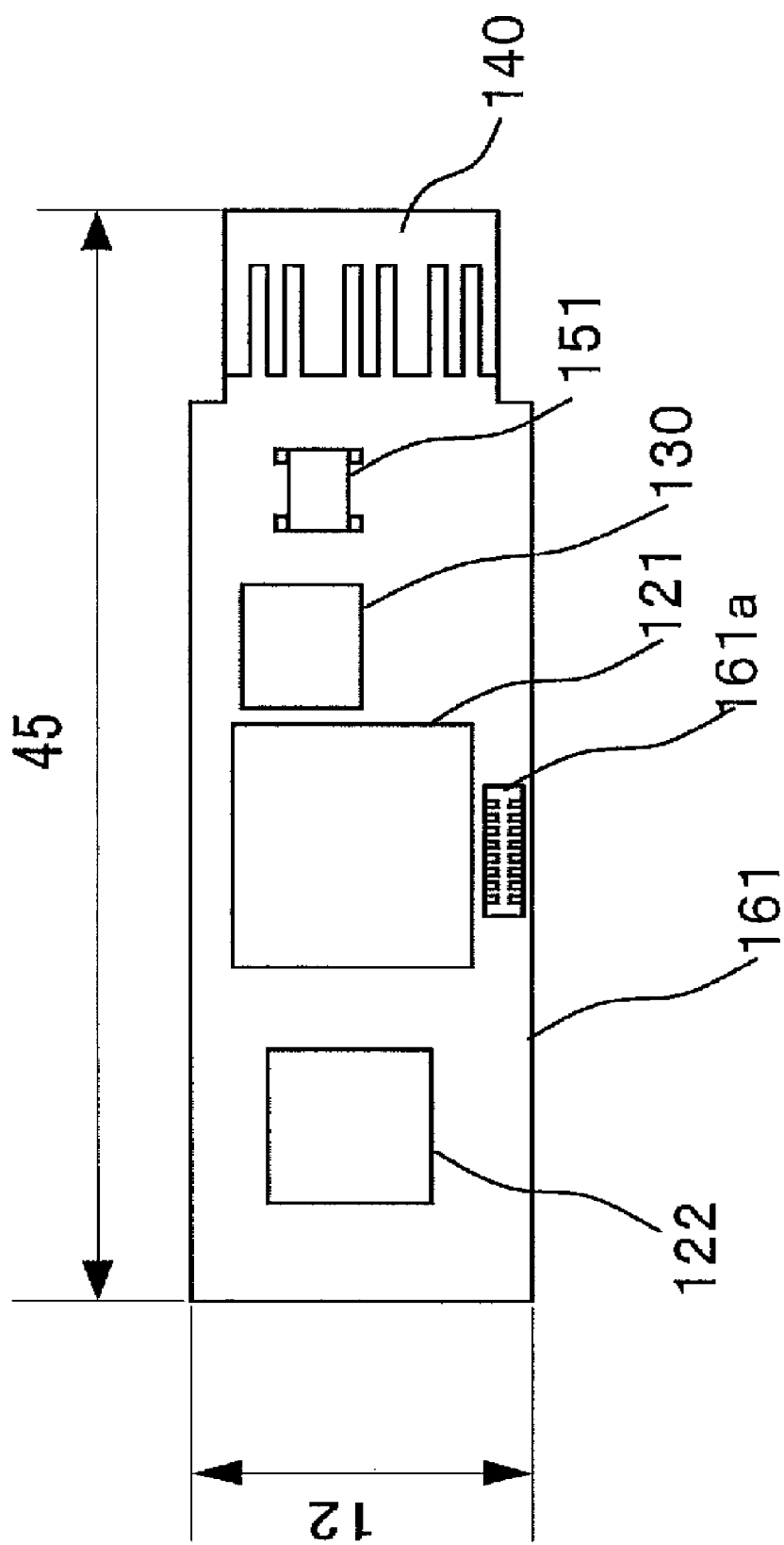
FIG. 8 is a configuration diagram of a main board according to the first embodiment.
Figure 9:
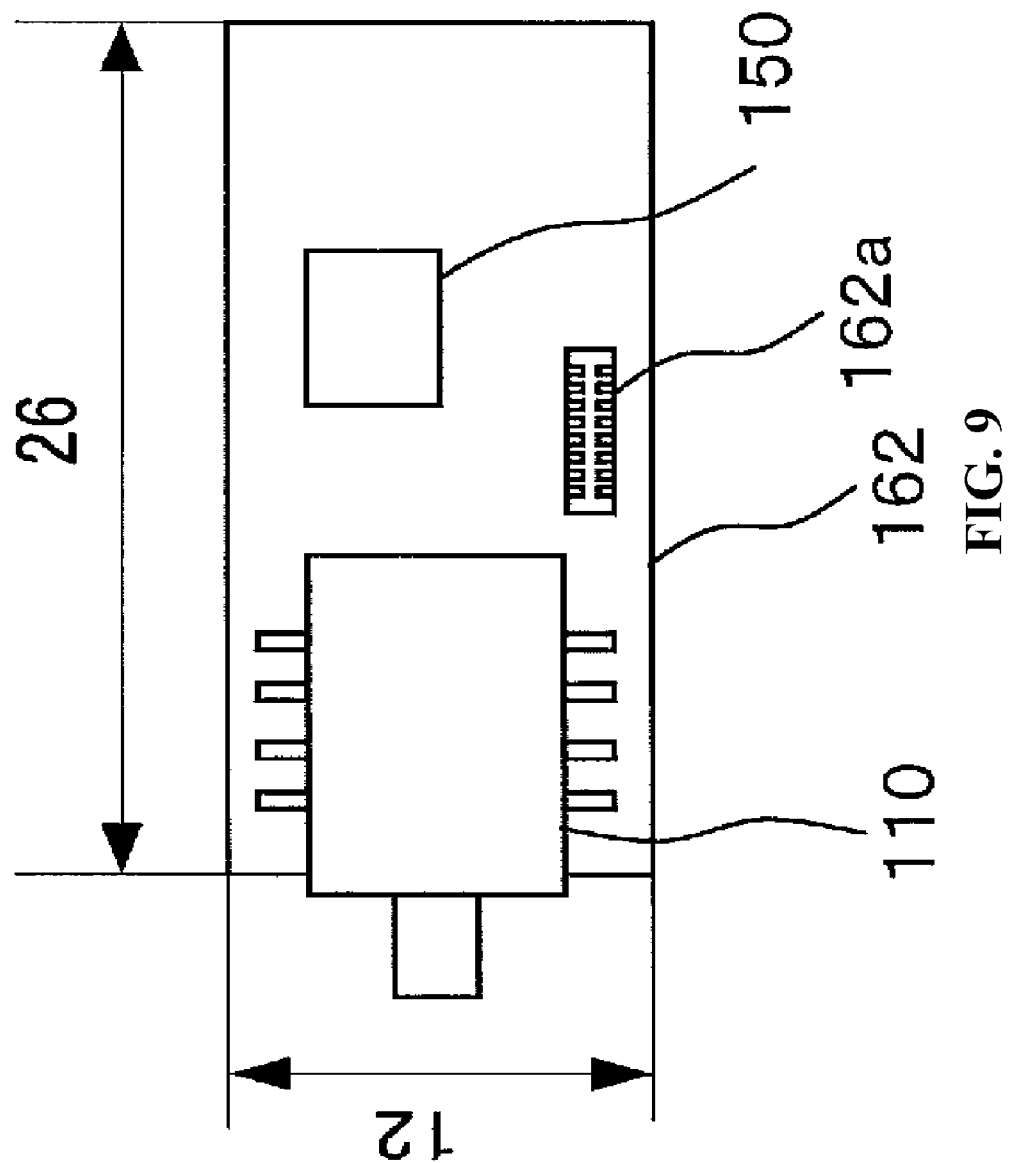
FIG. 9 is a configuration diagram of a sub board according to the first embodiment.

Moreover, among the individual component units to configure the ONU 105, the optical transceiver unit 110 and the serial/parallel transform unit 130 are the L1 layer of the OSI reference model, and the ONU function part 120 corresponds to the L2 layer thereof. According to the present embodiment, there is provided a configuration that the ONU function part 120 of the L2 layer and the serial/parallel transform unit 130 of the L1 layer are arranged at the main board 161, meanwhile, the optical transceiver unit 110 of the L1 layer and the power supply circuit 150 are arranged at the sub board 162. Here, configuration diagrams of the main board 161 and the sub board 162 are shown in FIG. 8 and FIG. 9 respectively. And also each dimension therefor is shown in the individual figures.

Further, on the main board 161 as shown in FIG. 8, the ONU LSI 121, the flash memory 122, the serial/parallel transform unit 130 and a control oscillator 151 are arranged. Still further, there is provided the SFP I/F 140 at a tip part of such the board. Still further, on the sub board 162 as shown in FIG. 9, the optical transceiver unit 110 and the power supply circuit 150 are arranged. Thus, there is provided the configuration that the ONU LSI 121 as the communication logic unit and the optical transceiver unit 110 are individually mounted on the different boards.

Figure 10:
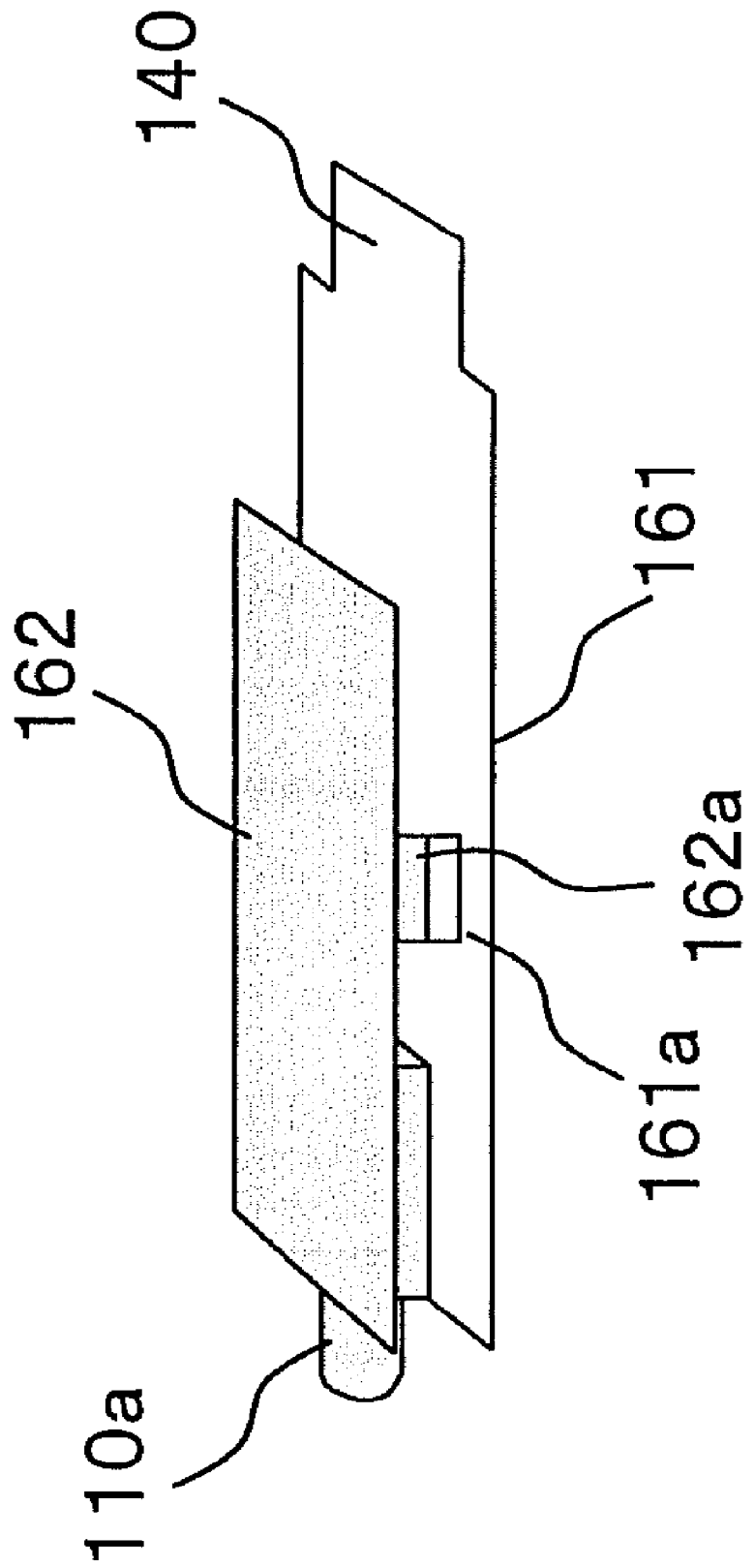
FIG. 10 is a diagrammatic perspective view showing a sterical arrangement of a main board and a sub board according to the first embodiment.

Still further, there is provided a configuration that the main board 161 and the sub board 162 are connected with using an electric signal, connectors for connection between boards 161a and 162a are provided thereat respectively, the sub board 162 is sterically arranged at an upper part of the main board 161, and then the connector for connection between boards 161a becomes to be connected with 162a thereby, as shown in FIG. 10. Furthermore, via the connectors for connection between boards 161a and 162a, a digital signal output from the LIM AMP 115 of the optical transceiver unit 110 is transmitted from the sub board 162 to the main board 161, meanwhile, a digital signal output from the ONU LSI is transmitted from the main board 161 to the sub board 162.

Figure 11:
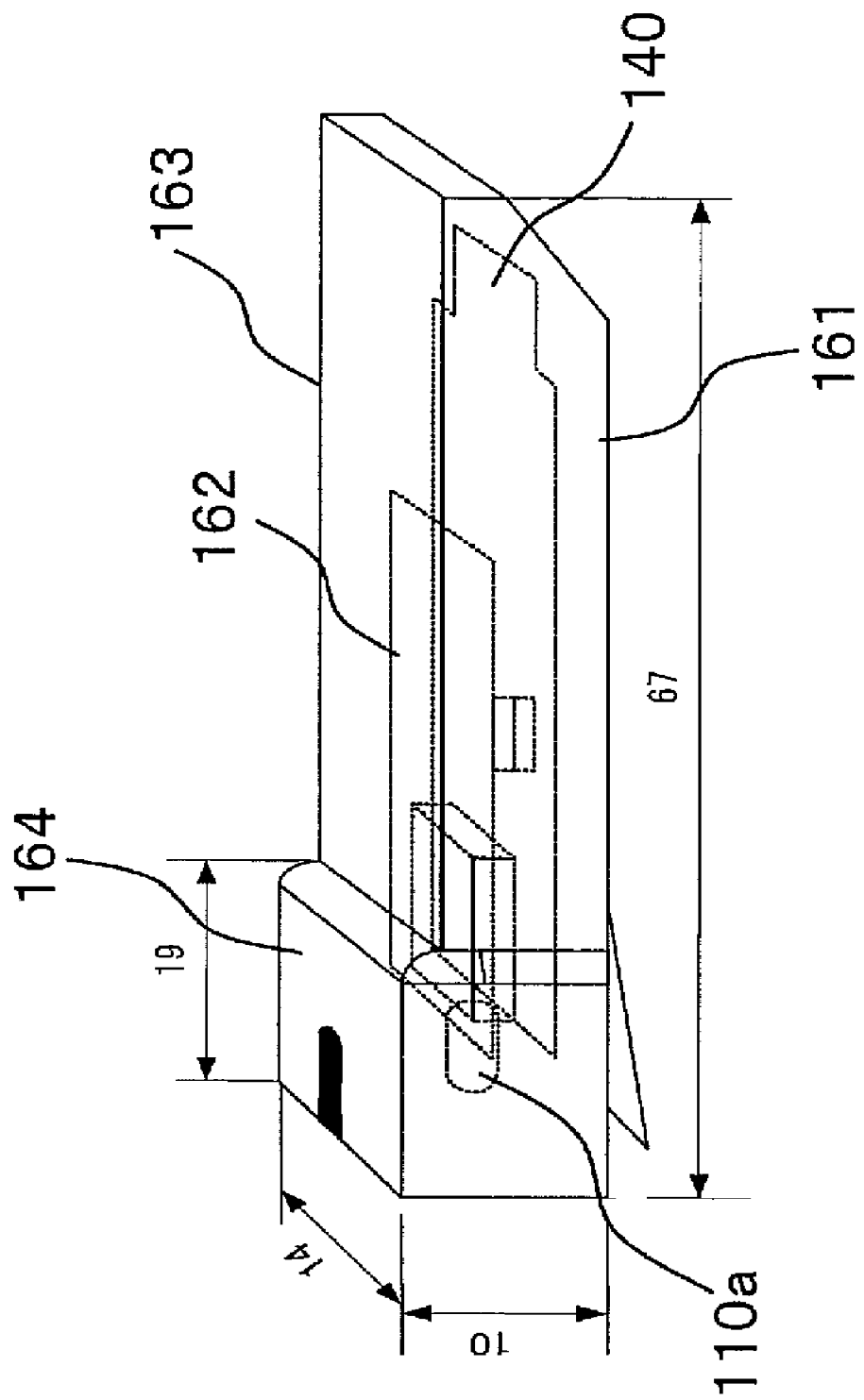
FIG. 11 is a diagrammatic perspective view of an SFP package according to the first embodiment.

As described above, because of configuring the ONU 105 by the main board 161 and the sub board 162 as using two sheets of the substrate modules, it becomes possible to design the sterical structure as shown in FIG. 10. And then it becomes possible to design a smaller size package for the ONU 105 thereby. Moreover, it is able to store the ONU 105 according to the present embodiment into the SFP package 163 having the dimensions as shown in FIG. 11. Such the SFP package 163 has the dimensions as the height of not taller than 10 mm, the width of not wider than 14 mm, and the depth of not deeper than 67 mm. Thus, it becomes able to design the package size for the ONU 105 according to the present embodiment as extremely smaller than that for any other conventional types.

Moreover, according to the conventional optical transceiver unit, the LIM AMP 115 is arranged at the external optical transceiver substrate of the OSA 118. On the contrary, according to the present embodiment, the TIA 114 and the LIM AMP 115 to be built in the optical transceiver unit 110 as shown in FIG. 4 are arranged at the inside of the OSA 118 mounted on the sub board 162 as adjacent to therebetween. And then by designing the OSA 118 to have a shield structure, it becomes possible to design a intercepted structure for a weak signal between the TIA 114 and the LIM AMP 115 so as not to be influenced by an effect of such as an external digital signal or the like.

According to the result of such the smaller size packaging, it becomes able to design a structure that the SFP interface module 140 of the ONU 105 becomes to be pluggable directly into the SFP slot 106a provided at the external node 106. And then it becomes possible to omit time of such as wiring cables and connecting between the ONU 105 and the external node 106.

According to the present embodiment, because of designing the configuration that the optical transceiver unit 110 and the ONU function part 120 as the L2 communication logic unit are individually mounted on the different boards, it becomes able to realize the smaller size packaging. Moreover, it becomes able to design individually for the optical transceiver unit 110 including a weak high frequency circuit and for the ONU LSI 121 having a high speed and a large amplitude. And then it becomes able to obtain an advantage, such as becoming easier to design with preventing from an external influence, such as a signal plunge into the optical transceiver unit 110, or the like. Furthermore, there becomes also provided another advantage that it becomes able to manufacture the substrate module for mounting the optical transceiver unit 110 as being separated from manufacturing the substrate module for mounting the ONU LSI 121 of the L2 communication logic unit.

According to FIG. 7, there is shown the case where the individual component units in the ONU 105 is arranged at two sheets of the substrate modules 161 and 162 respectively. However, it is also possible for those to be arranged at not less than three sheets of substrate modules. As one example, it may be also available to separate the optical transceiver unit 110 to be mounted on the sub board 162 from the power supply circuit 150, and then to mount either one thereof onto further another substrate module. Moreover, regarding the component units to be mounted on the main board 161, it may be also available to mount onto further another substrate module as separating therefrom. For example, it may be available to mount the flash memory 122 on another substrate module as separating from that for the sub board 162. Furthermore, it may be also available to group the individual component units in the ONU function part 120 and then to mount onto substrate modules of not less than two sheets.

Figure 12:
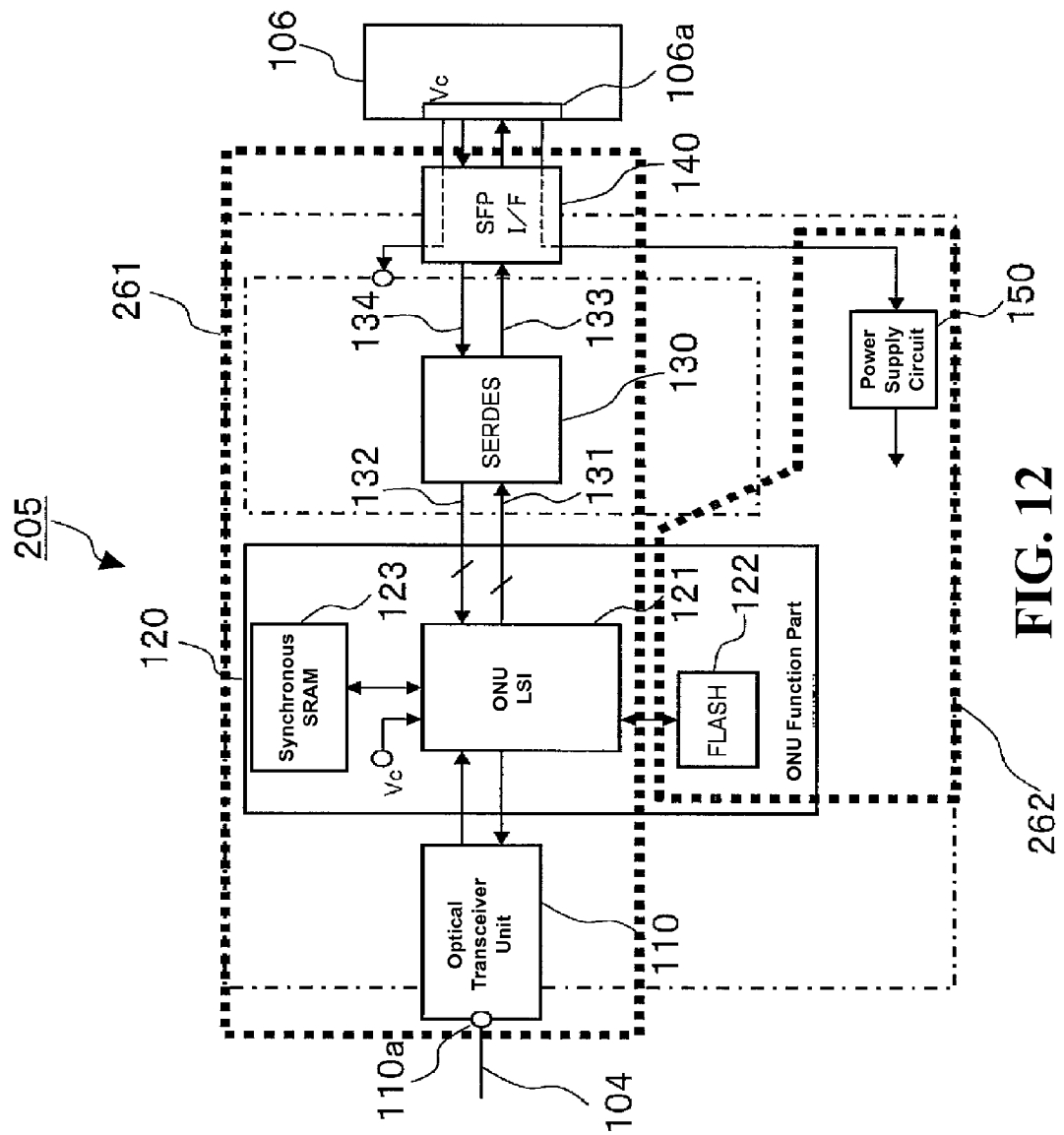
FIG. 12 is a block diagram showing one example of individual component units of an ONU according to the second embodiment to be grouped for a main board and a sub board.

The second embodiment according to the present invention will be described in detail below. Regarding an ONU 205 according to the present embodiment, a substrate module configuration is adopted as the embodiment shown in FIG. 1B. That is to say, the individual component units of the ONU 105 as shown in FIG. 3 is grouped into two as shown in FIG. 12, and then each thereof is separated and arranged for a main board 261 and a sub board 262.

According to the present embodiment, there is provided a configuration that the optical transceiver unit 110 of the L1 layer, the ONU LSI 121 of the L2 layer and the serial/parallel transform unit 130 of the L1 layer are arranged on the main board 261, and that only the flash memory 122 of the L2 layer and the power supply circuit 150 are arranged at the sub board 262. Here, configuration diagrams of the main board 261 and the sub board 262 are shown in FIGS. 13 and 14 respectively.

Figure 13:
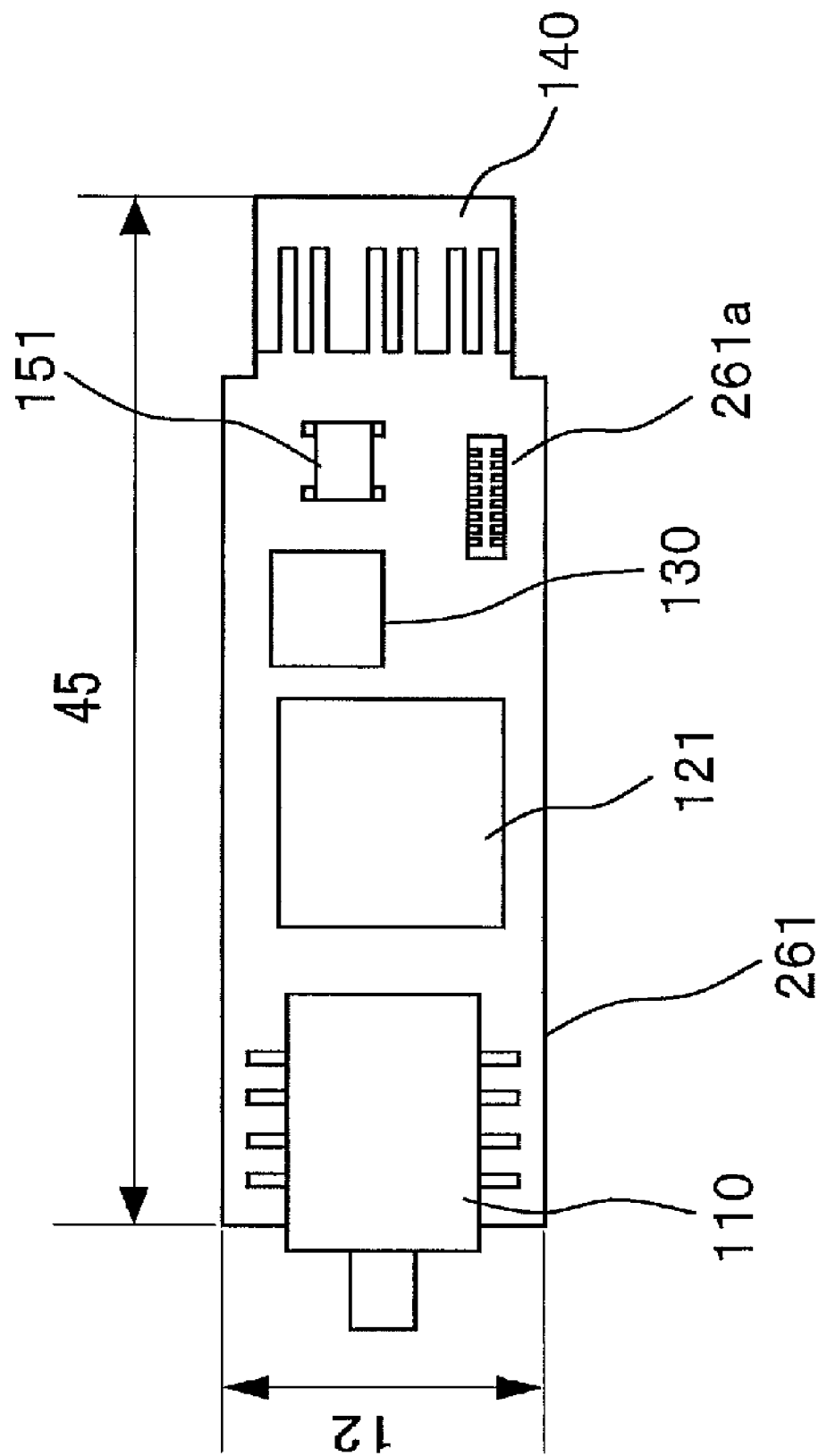
FIG. 13 is a configuration diagram of a main board according to the second embodiment.
Figure 14:
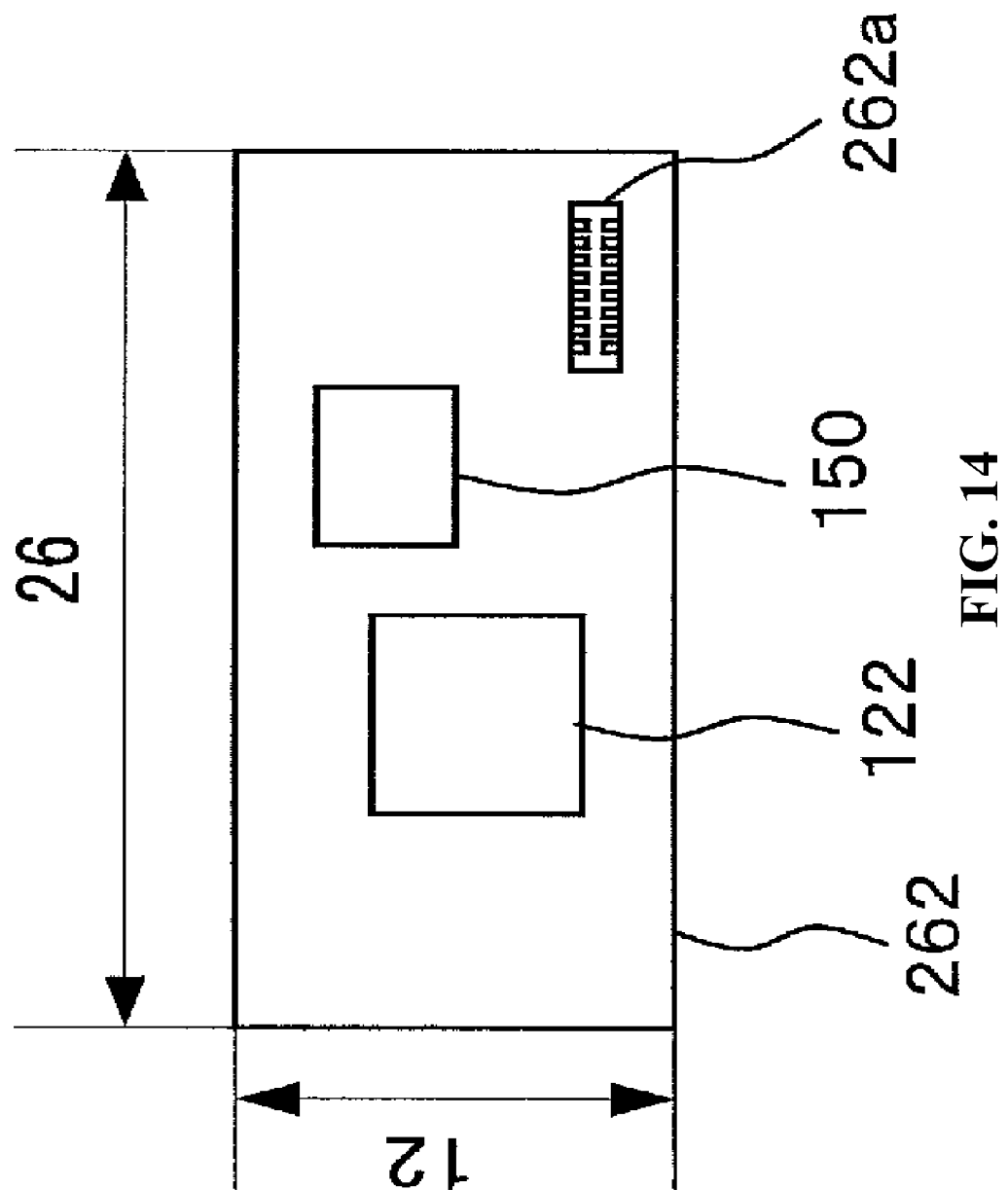
FIG. 14 is a configuration diagram of a sub board according to the second embodiment.

On the main board 261 as shown in FIG. 13, the optical transceiver unit 110, the ONU LSI 121, the serial/parallel transform unit 130 and the control oscillator 151 are mounted. Moreover, there is provided the SFP I/F 140 at a tip part of such the board. Further, on the sub board 262 as shown in FIG. 14, the flash memory 122 and the power supply circuit 150 are mounted.

Figure 15:
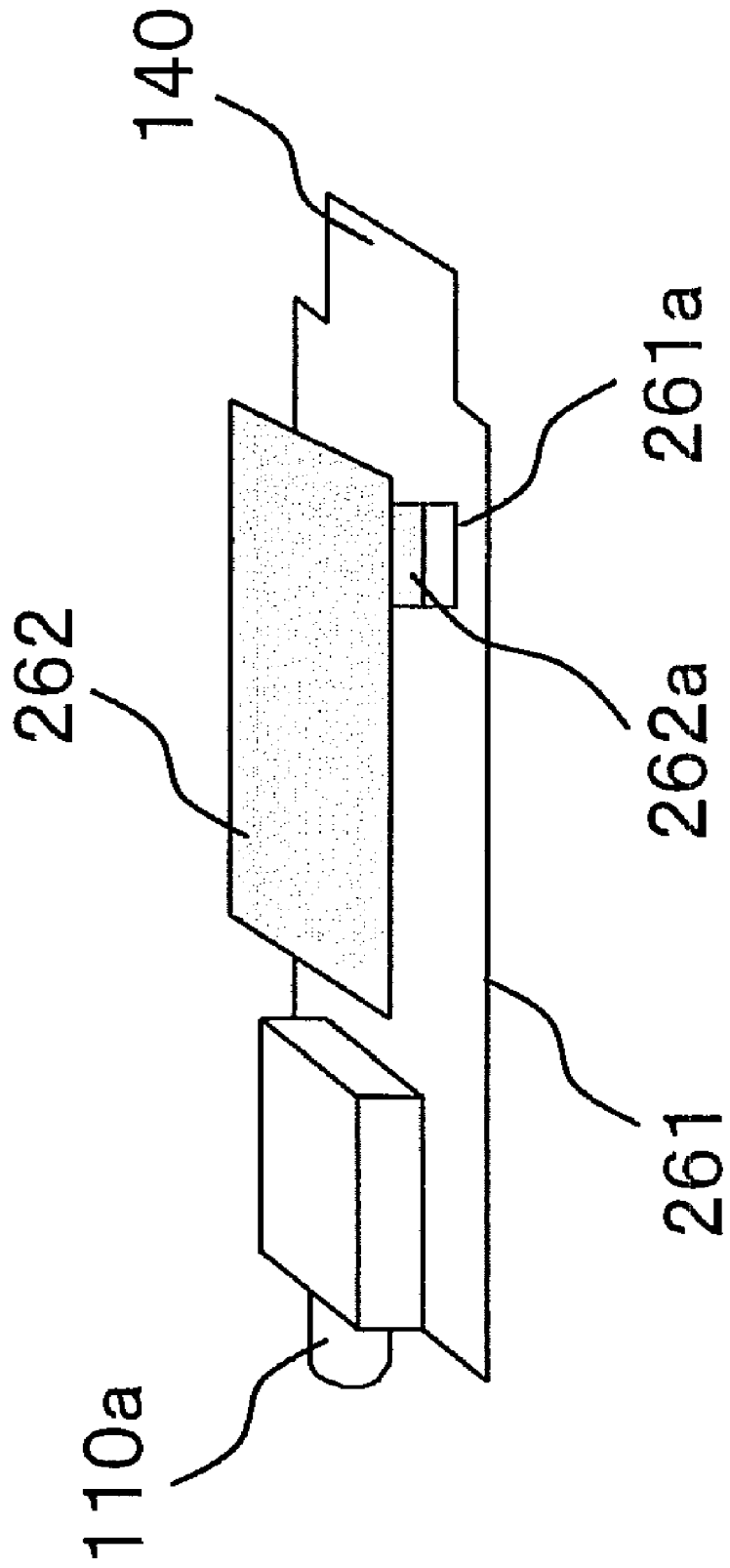
FIG. 15 is a diagrammatic perspective view showing a sterical arrangement of a main board and a sub board according to the second embodiment.

Still further, for the main board 261 and the sub board 262, connectors for connection between boards 261a and 262a are provided thereat respectively. Still further, the sub board 262 is sterically arranged at an upper part of the main board 261, and then the connector for connection between boards 261a becomes to be connected with 262a thereby, as shown in FIG. 15. Thus, because of configuring the ONU 205 by the main board 261 and the sub board 262 as using two sheets of the substrate modules, it becomes possible to design the sterical structure as shown in FIG. 15. And then it becomes possible to design a smaller size packaging for the ONU 205 thereby.

Figure 16:
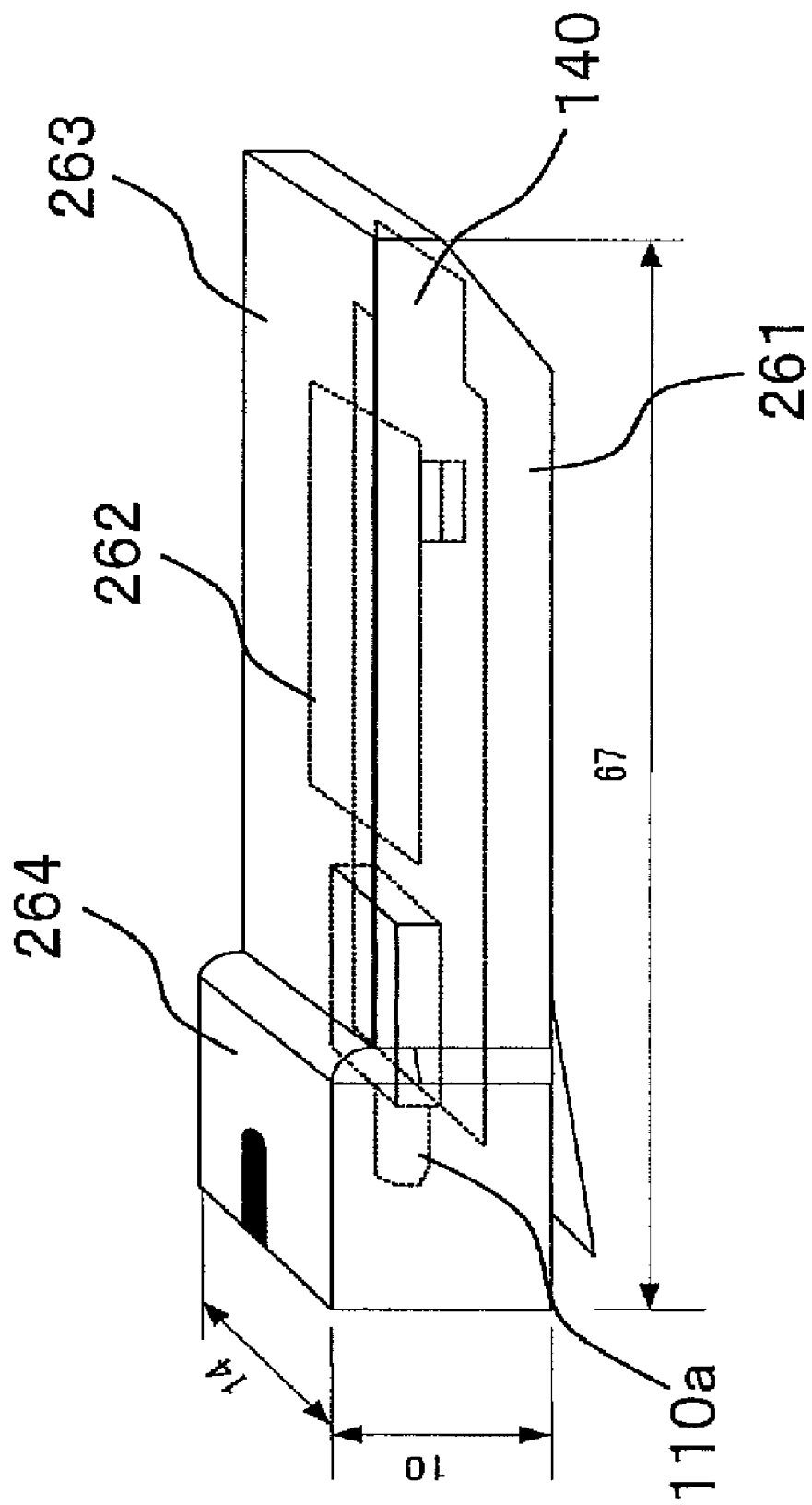
FIG. 16 is a diagrammatic perspective view of an SFP package according to the second embodiment.

Furthermore, it is able to store the ONU 205 according to the present embodiment into an SFP package 263 having the dimensions as shown in FIG. 16. Such the SFP package 263 has the dimensions as the height of not taller than 10 mm, the width of not wider than 14 mm, and the depth of not deeper than 67 mm. Thus, the ONU 205 according to the present embodiment becomes to have the package size as extremely smaller than that for any other conventional types.

As above described, according to the ONU 205 regarding the present embodiment, because of the structure that at least two sheets of the substrate modules 261 and 262 are used and then the individual component units of the ONU 205 is grouped and mounted therefor, and that the individual substrate modules 261 and 262 are sterically combined, it becomes able to realize the ONU 205 having the extremely smaller dimensions, and becomes possible to design a space saving and a high reliability.

Moreover, according to the present embodiment, it is possible to arrange the individual component units at not less than three sheets of substrate modules as well. As one example, regarding the component units to be mounted on the main board 261, it may be also available to separate the optical transceiver unit 110 to be mounted on another substrate module different from the main board 161. Further, it may be available to mount the serial/parallel transform unit 130 on another substrate module different therefrom as well. Still further, it is possible to group and mount the individual component units of the ONU function part 120 at not less than three sheets of substrate modules as well. Furthermore, regarding the sub board 262, it may be also available to separate the flash memory 122 from the power supply circuit 150, and then to mount either one thereof to further another substrate module.

Figure 17:
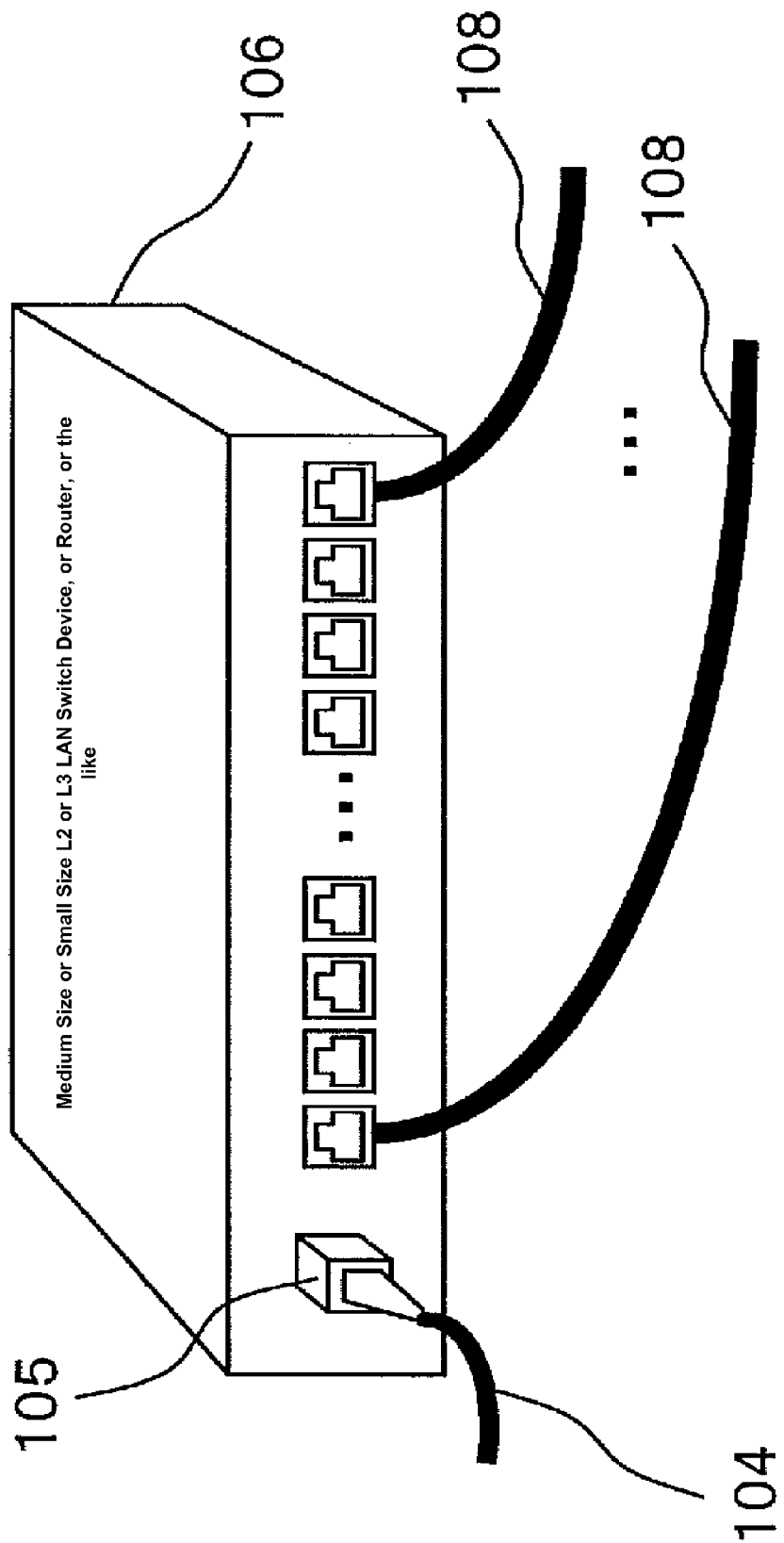
FIG. 17 is a diagrammatic perspective view showing one example of an ONU according to the first or the second embodiment to be inserted into an external node.
Figure 18:
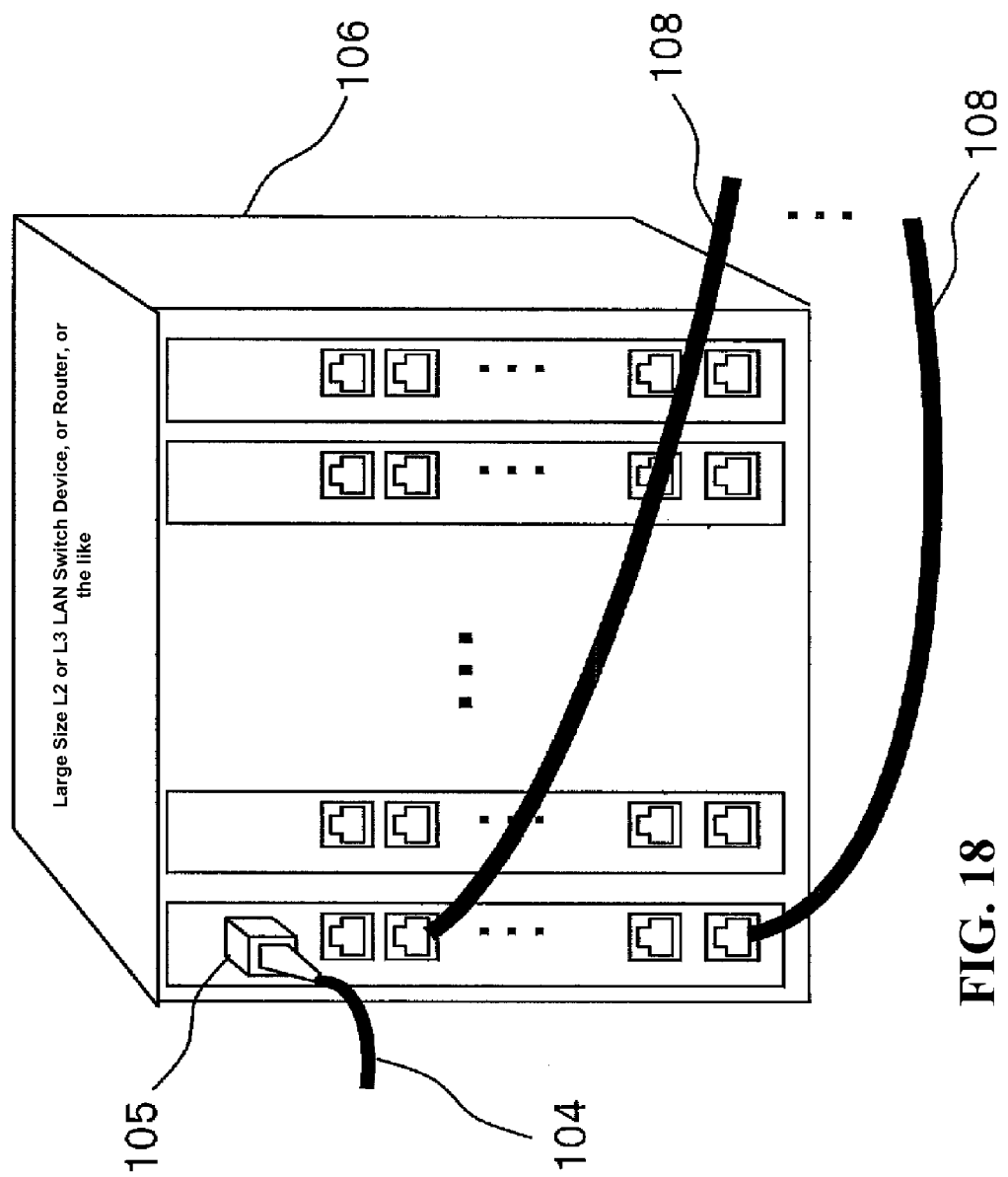
FIG. 18 is a diagrammatic perspective view showing another example of the ONU according to the first or the second embodiment to be inserted into the external node.
Figure 19:
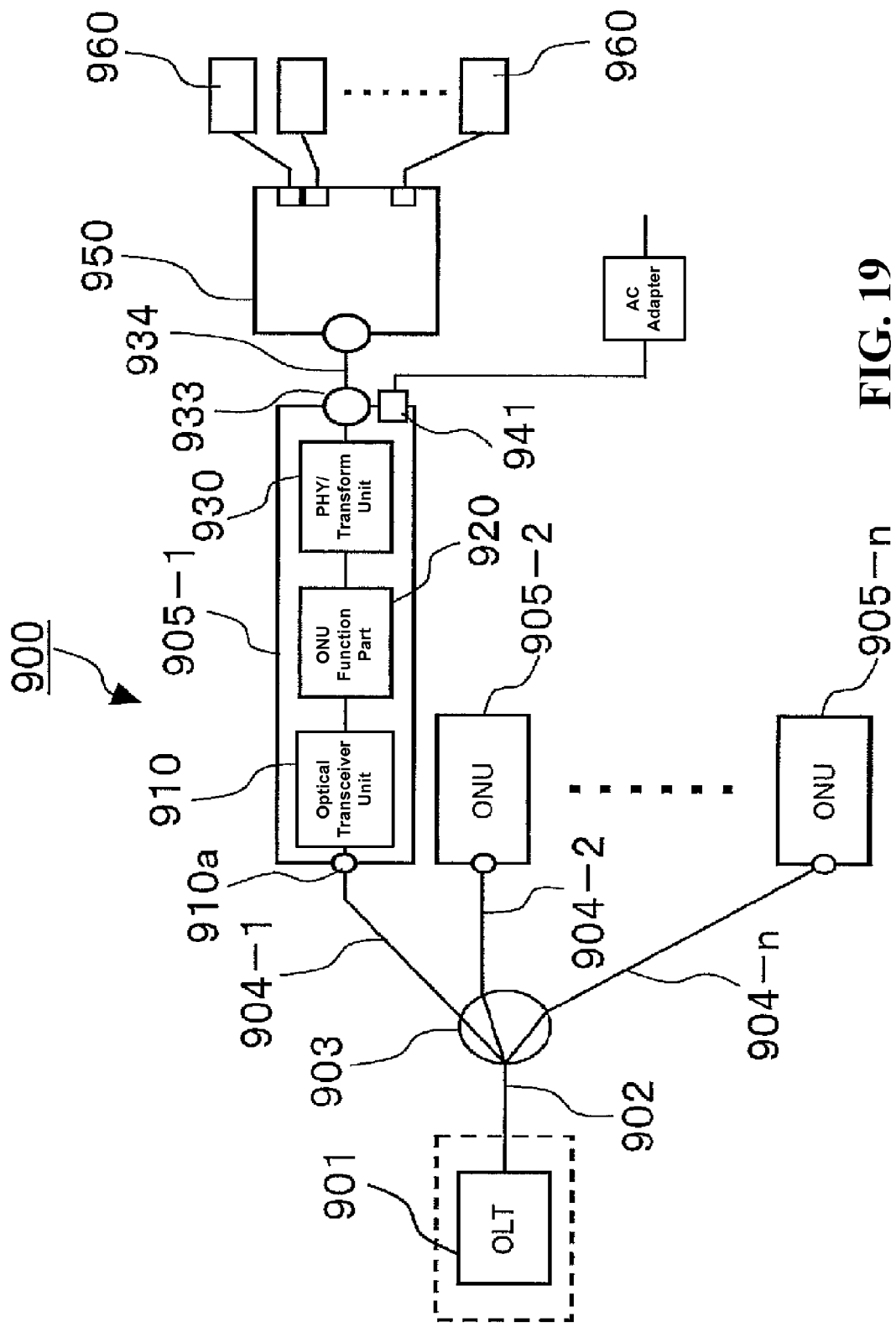
FIG. 19 is a configuration diagram showing a configuration of a conventional optical transmission system of PON type.
Figure 20:
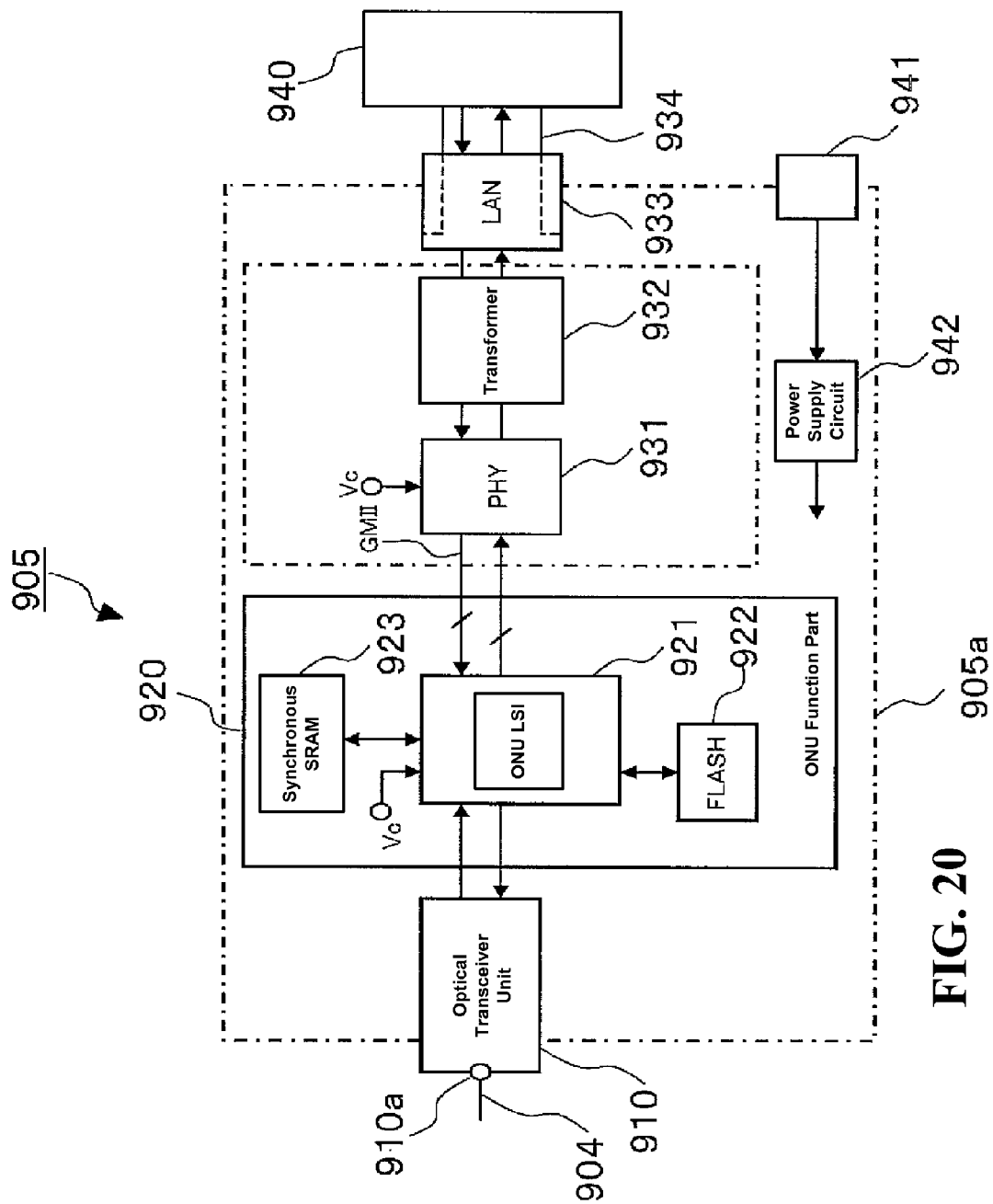
FIG. 20 is a detailed block diagram of a conventional ONU.
Figure 21:
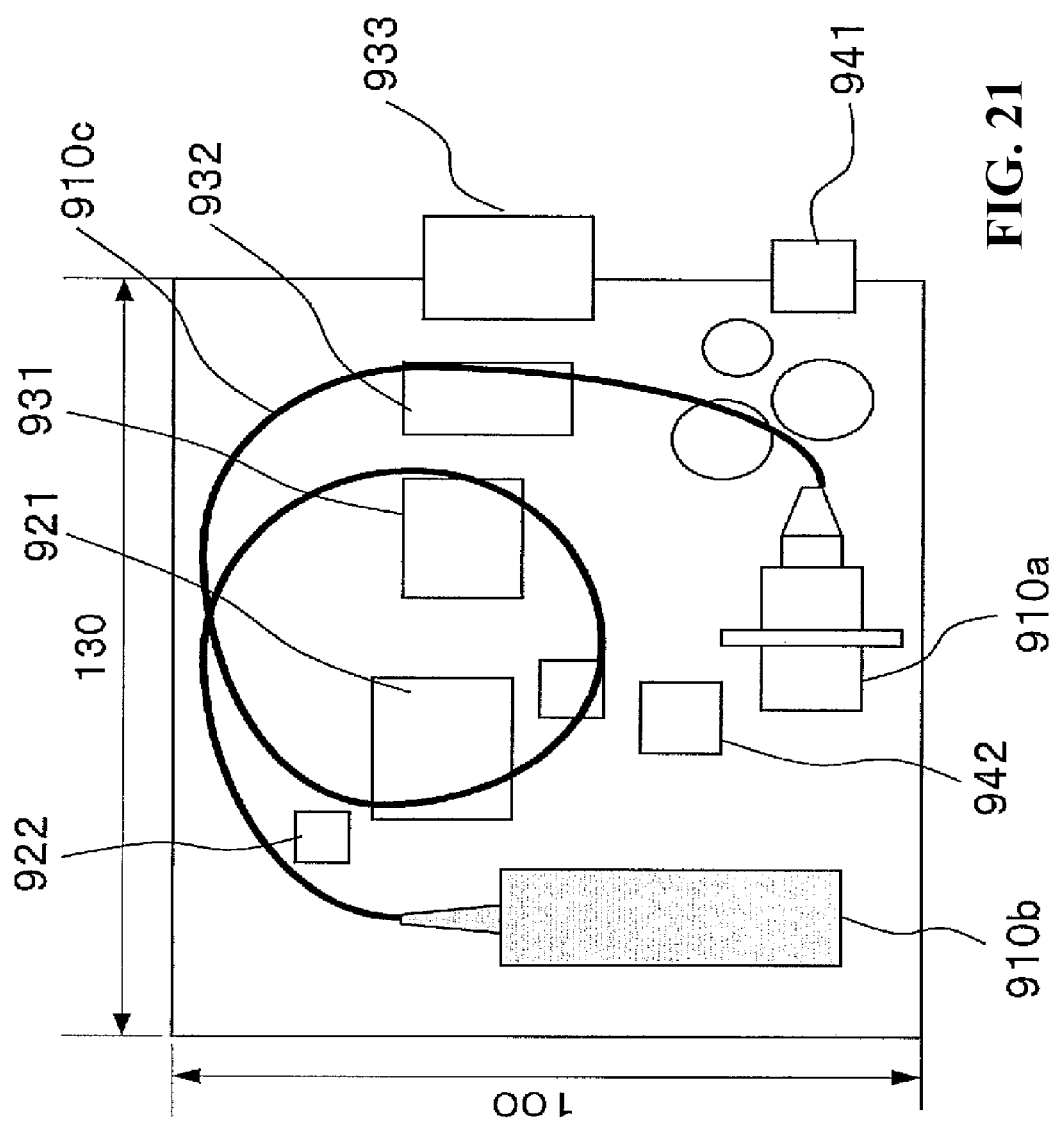
FIG. 21 is a configuration diagram showing one example of a general board configuration regarding a conventional ONU.
Figure 22:
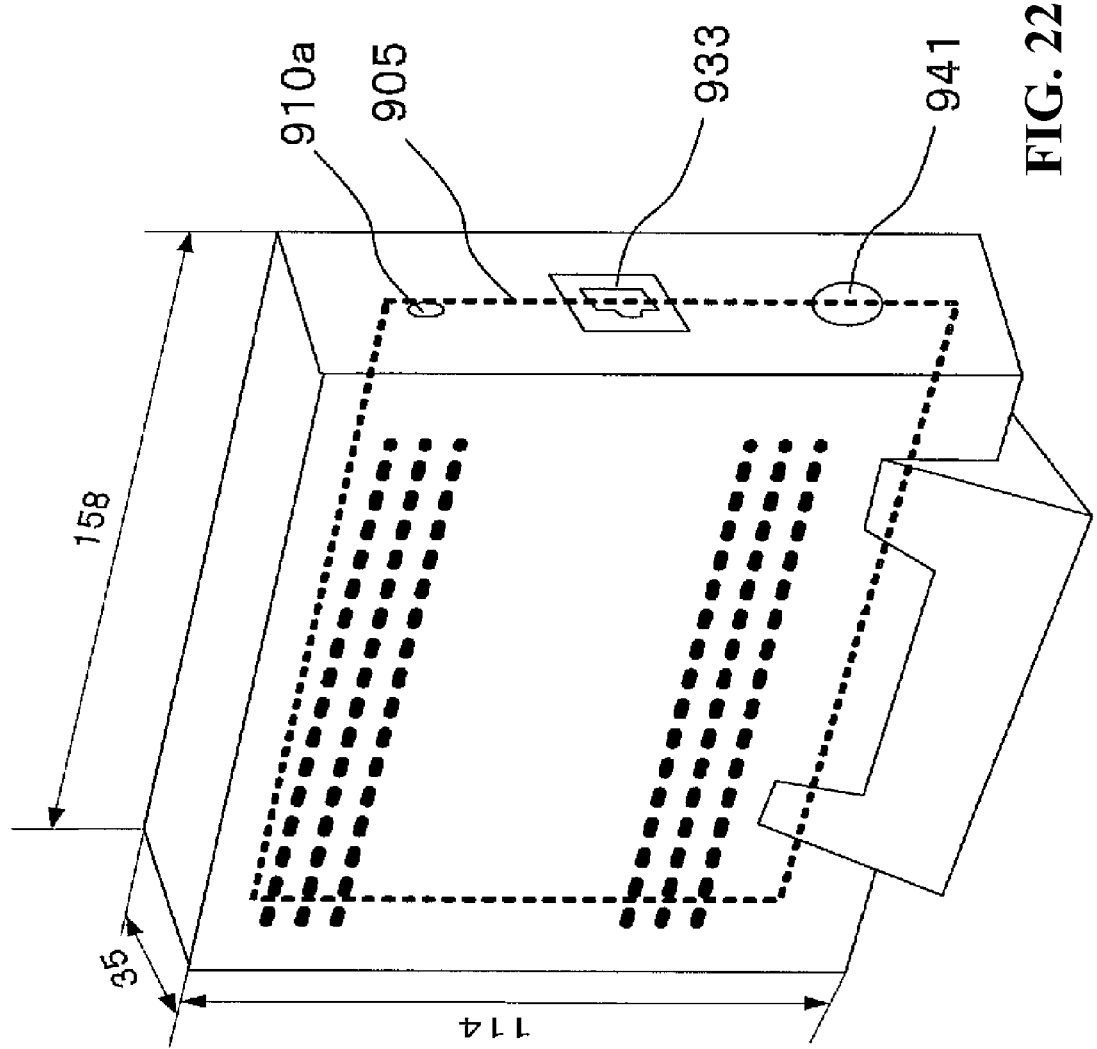
FIG. 22 is a diagrammatic perspective view showing one example of an outside dimension regarding a conventional ONU.
Figure 23:
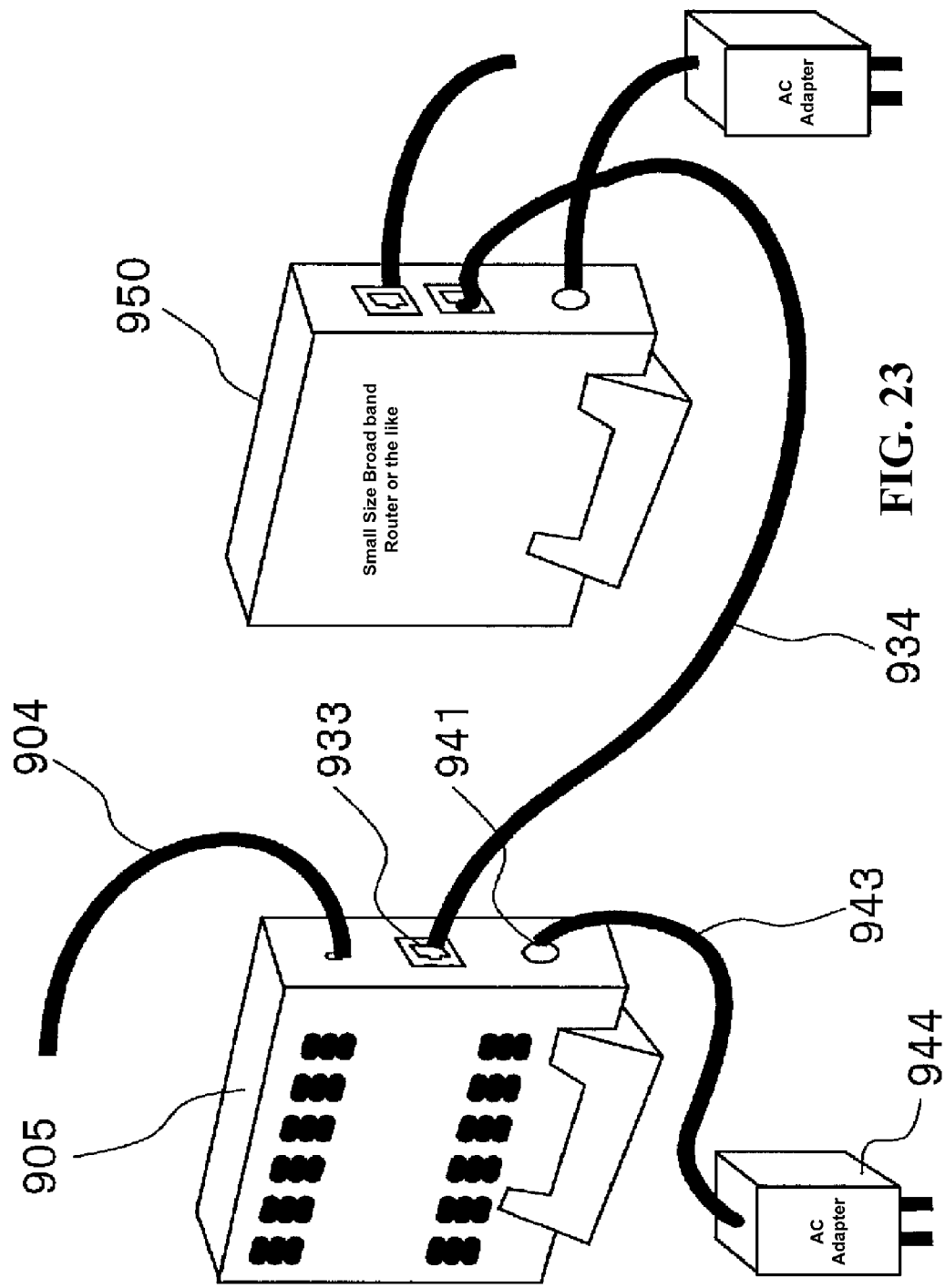
FIG. 23 is a diagrammatic perspective view showing one example of a LAN device to be connected with a conventional ONU.
Figure 24:
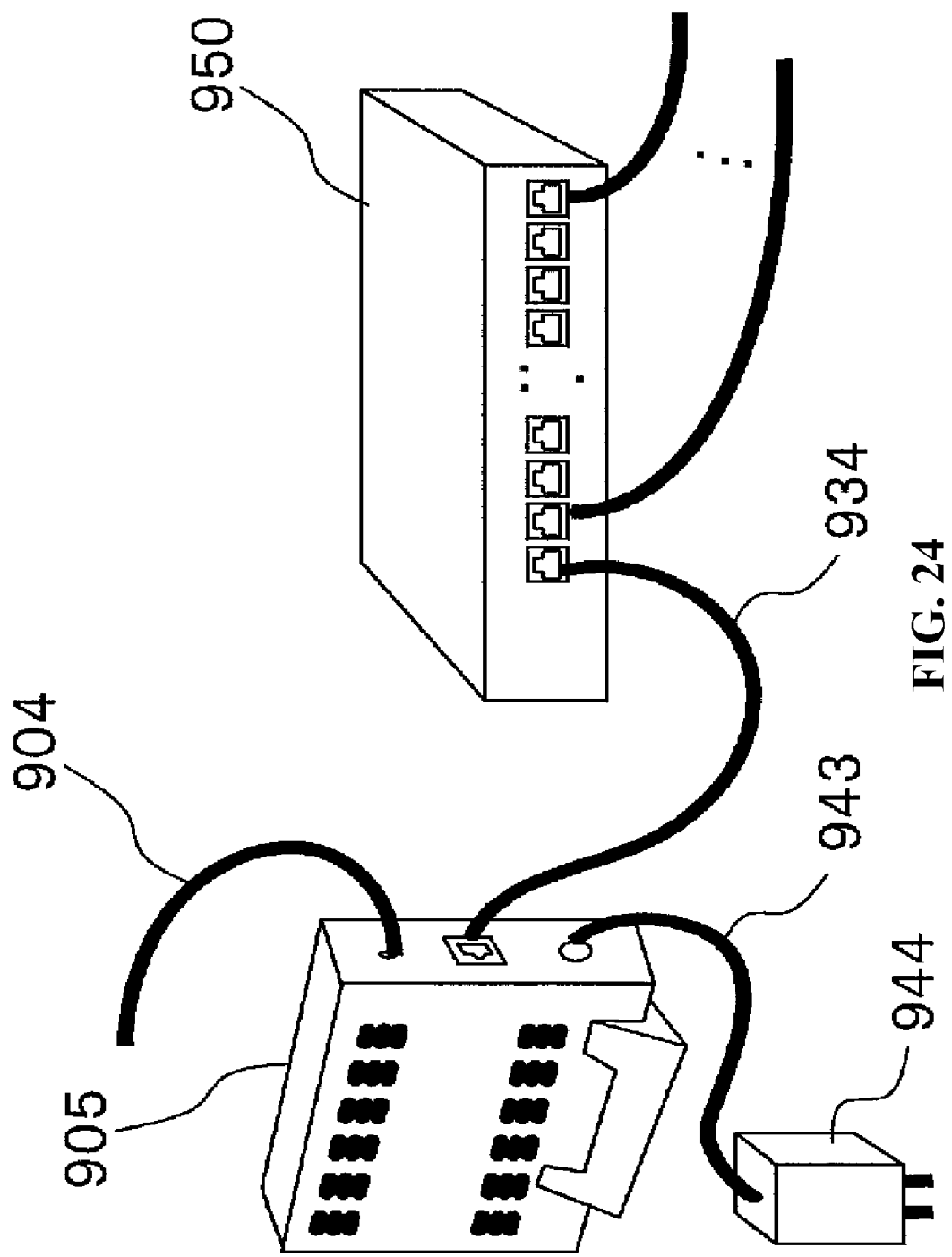
FIG. 24 is a diagrammatic perspective view showing another example of the conventional ONU to be connected with the LAN device.
Figure 25:
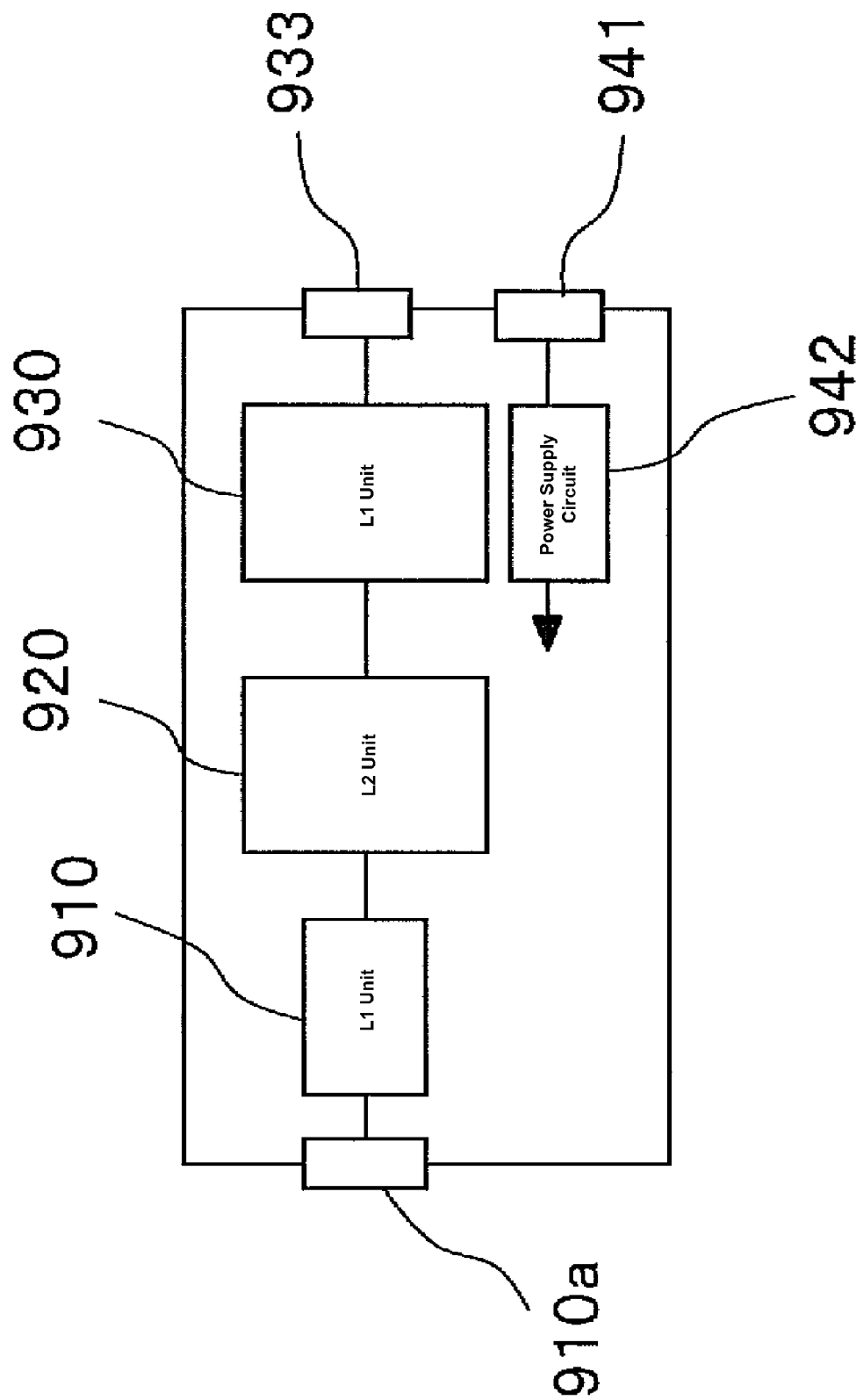
FIG. 25 is a block diagram of a conventional ONU to be grouped for each layer of the OSI reference model.

According to the ONU 105 and 205 regarding the above mentioned embodiments, it becomes able to design the depth dimensions of the ONU 105 and 205 as not deeper than 70 mm, and also it becomes able to design the dimensions of SC connector parts 164 and 264 as proximately not longer than 19 mm, as shown in FIGS. 11 and 16. As a result, in a case of inserting the ONU 105 according to the present embodiment into the external node 106 as shown in FIG. 17 or 18, and of further inserting the optical fiber cable 104 into the ONU 105, it becomes able to shorten a outstanding dimension of the optical fiber cable 104 in a direction forward therefrom, as the SC connector parts 164 and 264 are shorter. And then it becomes able to obtain an advantage of space saving at a time of mounting therefor at an inside of a rack.

According to the above mentioned embodiment, there is described the case where the SFP is used as the multi source agreement interface module, however, it is also possible to use another module, such as the GBIC or the like. In either case thereof, it is able to design the ONU according to the present invention to be a smaller sized package. Moreover, by inserting it directly into a slot of such as the GBIC, the SFP, or the like, provided at an external node of such as the Ethernet (the registered trade name) LAN switch or the like, it becomes possible to connect easily between the ONU and the external node without wiring therebetween. As a result, it becomes able to install the ONU according to the present invention within a smaller space. Moreover, because it becomes unnecessary to use any power adapters, any LAN cables, or the like, for the ONU, it becomes possible to increase the reliability of the ONU. Further, it becomes also possible to design the power consumption of the ONU to be a power saving type as approximately 1.3 watt as it is one fifth of that for any conventional types.

Still further, in a case of using the type of SFP standard for an ONU, it is able to insert it directly into a multi source agreement (MSA) interface slot provided at an external node without using any LAN cables, and then to connect therebetween. Furthermore, not only the LAN cable but also any power cables and any AC adapters for the ONU become unnecessary. Thus, it becomes able to obtain large merits, such as improving remarkably a space factor, or the like.

However, due to forming the ONU of the SFP standard to be the compact dimension, any indication unit, such as any LED or the like, is not provided at all. Hence, there is a problem, such as that it is not able to be notified whether a communication to between the OLT is established in a normal way, or the like.

That is to say, there is provided the LED at the external node side for notifying the establishment to between the OLT, however, this is turned on when all of the communication conditions between the OLT and the ONU are established and also all of the communication conditions between the ONU and the external node are established. Hence, when the LED for notifying the communication establishment is not turned on, there is the problem, such as that it is not able to be notified whether the communication conditions between the OLT and the ONU are not established, or the communication conditions between the ONU and the external node are not established, or the like.

Moreover, it is required to establish a unique PON link for the PON, however, the PON link corresponds to the L2 layer according to the OSI reference model, and then there is no method to transmit a status thereof to an external node, such as a LAN switch or the like. Hence, there is no unit for indicating the status of the PON link provided at the external node. And then in a case of using an ONU of the SFP standard, there is no method to be notified the stats of the PON link. Here, according to next embodiment regarding the present invention, there is provided another customer premises optical network unit of the SFP standard comprising a unit for indicating a communication state.

The Third Embodiment

Figure 26:
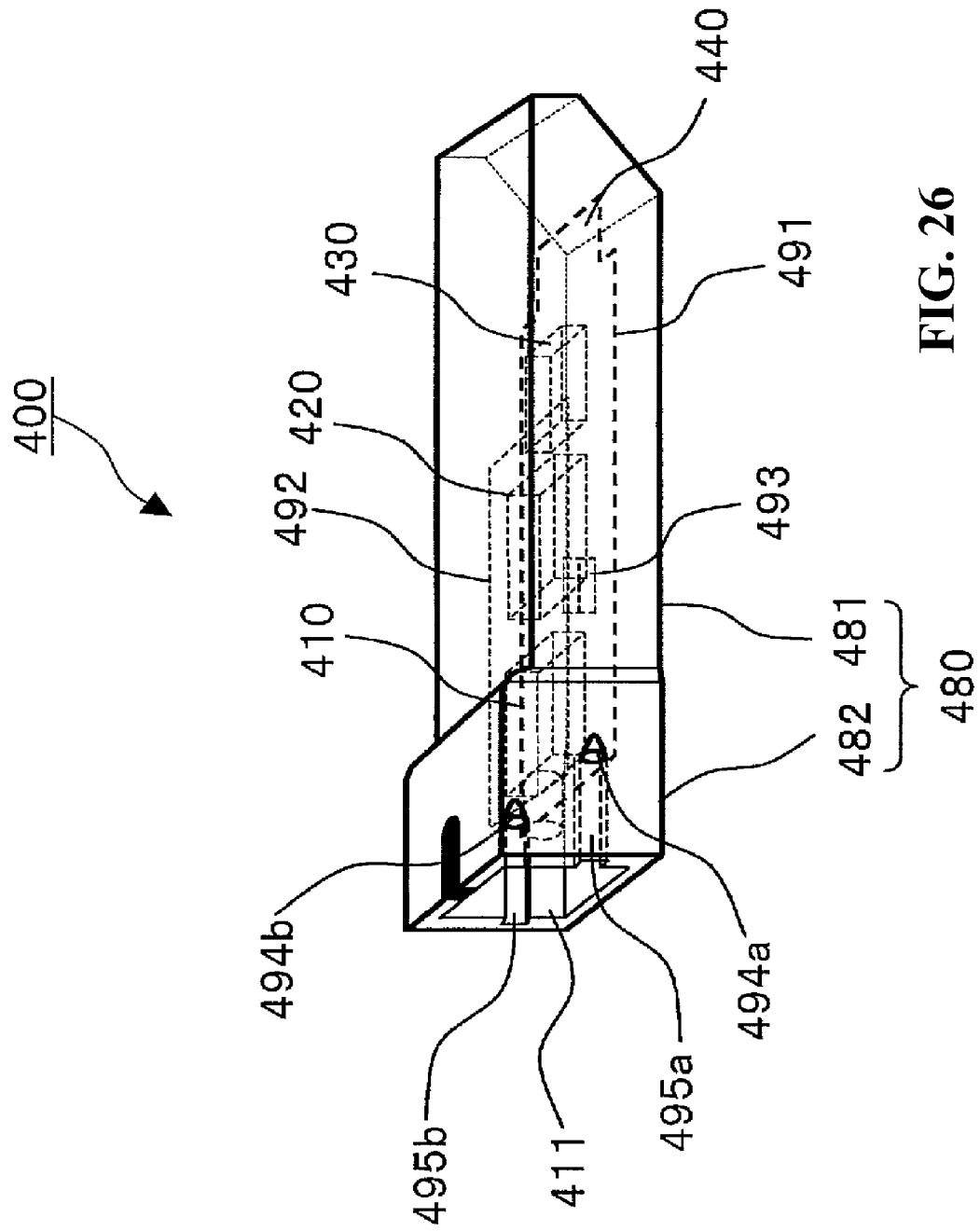
FIG. 26 is a diagrammatic perspective view showing an overview of a customer premises optical network unit according to the third embodiment.
Figure 27:
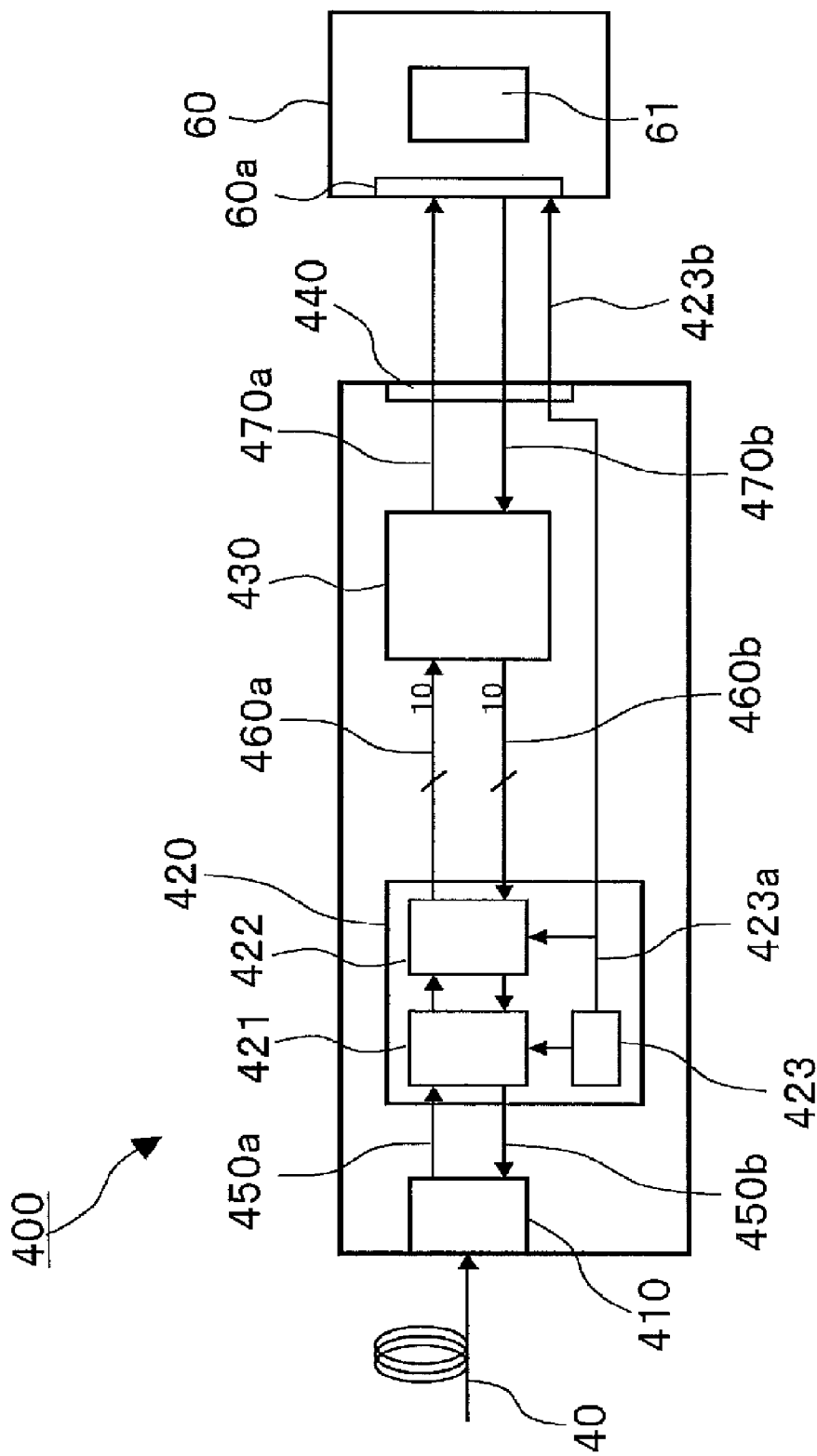
FIG. 27 is a block diagram showing a schematic functional configuration of the customer premises optical network unit according to the third embodiment.
Figure 28:
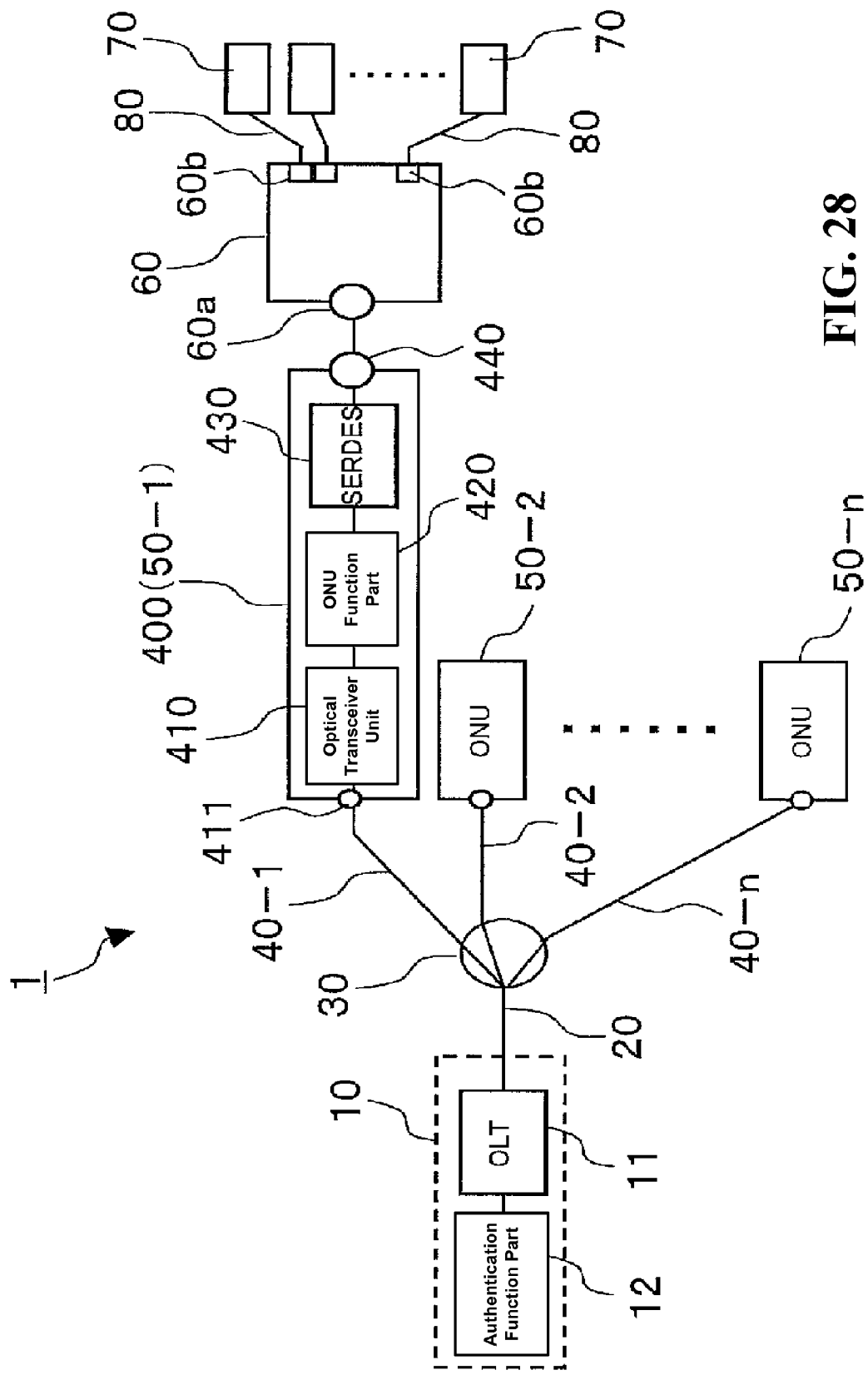
FIG. 28 is a configuration diagram showing one example of an optical transmission system of PON type in which the customer premises optical network unit according to the third embodiment is used.

A customer premises optical network unit according to the third embodiment regarding the present invention is shown in FIG. 26 and FIG. 27. FIG. 26 is a diagrammatic perspective view showing an overview of a customer premises optical network unit 400 according to the present embodiment. And, FIG. 27 is a block diagram showing a schematic functional configuration of the customer premises optical network unit 400. Such the ONU 400 as shown in FIGS. 26 and 27 is a device to be used for an optical transmission system of PON type as shown in FIG. 28. FIG. 28 is a configuration diagram showing one example of the optical transmission system of PON type in which the ONU 400 according to the present embodiment is used.

Regarding an optical transmission system 1 of PON type as shown in FIG. 28, a PON interface card 10 provided at a central office comprises an optical line termination (OLT) 11 and an authentication function part 12. Moreover, for an optical input and output terminal of the OLT 11, one end of an optical fiber 20 as an optical transmission path is connected therewith. Further, for another end of the optical fiber 20, that is to say, for a customer premises side, an optical coupler (optical multiplexing and de-multiplexing part) 30 is connected therewith. Still further, regarding the optical coupler 30, one optical transmission path of the optical fiber 20 is branched into a plurality of optical transmission paths of optical fibers 40-1 to 40-*n* (n: natural number; referred to as 40-1 to n hereinafter), and then ONUs 50-1 to n are connected to each of the optical fibers 40-1 to n respectively.

Moreover, the ONUs 50-1 to n are provided for each of customer premises sides, and then an external node, such as a personal computer, a LAN switch, or the like, is connected thereto. In FIG. 28, an external node 60 is connected to the ONU 50-1, and then a plurality of peripheral devices 70 are connected to a plurality of ports 60*b* provided at the external node 60, via an optical fiber 80. Further, as the external node 60, the L2 LAN switch, the L3 LAN switch, a router, or the like, is used therefor.

Furthermore, for the OLT 11 and the ONUs 50-1 to n, a device is used, which suits the regulation of the gigabit passive optical network (GPON; the method to be pursuant to the ITU standard G.984.x), or of the gigabit Ethernet (the registered trade name) PON (GEPON; the method to be pursuant to the IEEE 802.3ah standard).

The ONU 400 according to the present embodiment is used for the ONUs 50-1 to n as shown in FIG. 28. Next, an embodiment will be described in detail below as one example, wherein the ONU 400 according to the present embodiment is used for the ONU 50-1. Such the ONU 400 is an SFP module to be connected directly to an external node (the L2 LAN switch, the L3 LAN switch) to be pursuant to the gigabit Ethernet (the registered trade name). Moreover, it is a dismountable module for becoming possible to transmit between an optical fiber channel to be connected to the OLT 11 and a gigabit Ethernet (the registered trade name) physical layer of the external node 60.

Moreover, the ONU 400 comprises an optical transceiver unit 410 comprising an optical connector 411, for connecting to the OLT 11 at the central office side via an optical fiber 40 or the like with using an optical signal. Further, it comprises an MSA interface module 440 for connecting between a serial/parallel transform unit or a serializer/deserializer (SERDES) 430 and the external node, for connecting to the external node 60 with using a serial electric signal.

Still further, the external node 60 is connected to the MSA interface module 440, and also the peripheral devices 70 are connected to the ports 60b to be provided as a plurality thereof. Thus, a plurality of the peripheral devices 70 are connected to the OLT 11 at the central office via the ONU 400.

Still further, the ONU 400 further comprises an optical network unit function part (ONU function part) 420 for performing such as a termination process or the like. Still further, the ONU function part 420 is connected to between the optical transceiver unit 410 using a first serial transmission paths 450a and 450b to transmit a serial electric signal, and connected to between the serial/parallel transform unit 430 using parallel transmission paths 460a and 460b to transmit a parallel electric signal, as shown in FIG. 27. Furthermore, a second serial transmission paths 470a and 470b to transmit a serial electric signal are used for connecting between the serial/parallel transform unit 430 and the MSA interface module 440.

The optical transceiver unit 410 transforms an optical signal to an electric signal which is transmitted from the OLT 11 at the central office (an opto-electrical transform), and then outputs such the electric signal to the ONU function part 420 via the first serial transmission path 450a. Moreover, it transforms an electric signal to an optical signal which is input from the ONU function part 420 via the first serial transmission path 450b (an inverse opto-electrical transform), and then it transmits such the optical signal to the OLT 11.

While, the ONU function part 420 transforms a serial signal to a parallel signal which is input from the optical transceiver unit 410, performs a predetermined process therefor, and then outputs such the signal to the serial/parallel transform unit 430 via the parallel transmission paths 460a. Moreover, it transforms a parallel signal to a serial signal after performing a predetermined process therefor, which is input from the serial/parallel transform unit 430 via the parallel transmission paths 460b, and then outputs such the signal to the optical transceiver unit 410. Furthermore, it becomes able to design the parallel signal to be a signal of ten bits for example, which is transmitted between the ONU function part 420 and the serial/parallel transform unit 430.

While, the serial/parallel transform unit 430 transforms a parallel signal to a serial signal which is input from the ONU function part 420, and then outputs such the signal to the external node 60 via the second serial transmission paths 470a and the MSA interface module 440. Moreover, it transforms a serial signal to a parallel signal which is input from the external node 60 via the MSA interface module 440 and the second serial transmission paths 470b, and then outputs such the signal to the ONU function part 420.

Moreover, the ONU function part 420 comprises a first MAC unit 421 and a second MAC unit 422 as two of the MAC units, and a management interface 423, wherein the first MAC unit 421 and the second MAC unit 422 perform a media access control (MAC) as pursuant to the IEEE 802.3ah. Here, one example of a detailed configuration regarding the ONU function part 420 is shown in FIG. 29.

Figure 29:
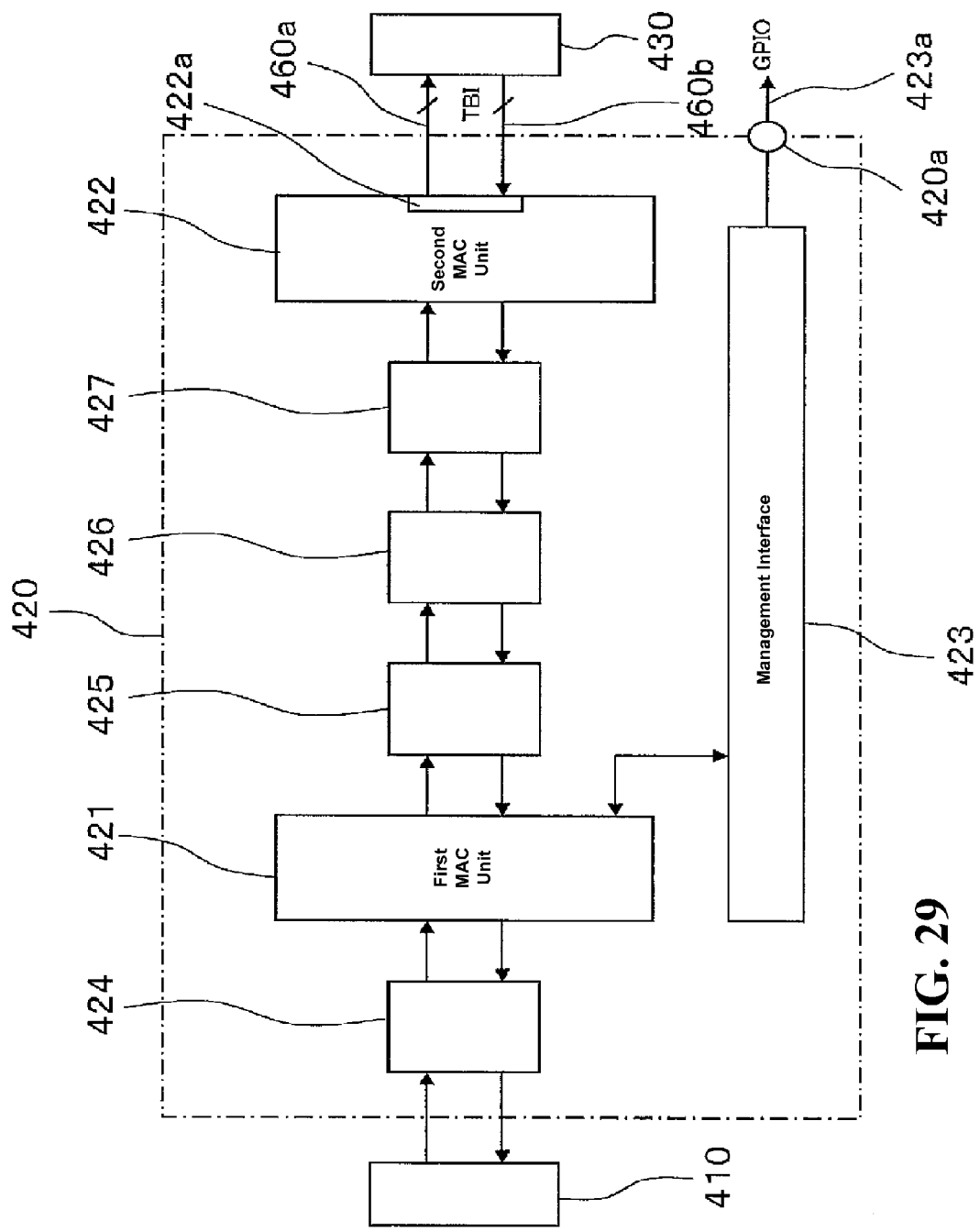
FIG. 29 is a block diagram showing one example of a detailed configuration regarding an ONU function part.

According to the ONU function part 420 as shown in FIG. 29, the first MAC unit 421 is connected to an electric signal terminal of the optical transceiver unit 410 via a gigabit serializer/deserializer (gigabit SERDES) 424. Moreover, the first MAC unit 421 is connected to the second MAC unit 422 as well, via an Ethernet (the registered trade name) passive optical network (EPON) lookup engine 425, a LAN switch 426 and a gigabit Ethernet (the registered trade name) lookup engine 427.

While, the management interface 423 performs a predetermined process for establishing a communication to between the OLT 11 via the optical transceiver unit 410, the gigabit serializer/deserializer 424 and the first MAC unit 421, and then outputs a GPIO signal 423a from a GPIO terminal 420a. Here, it is able to design the GPIO signal 423a as one before establishing the communication to between the OLT 11 and zero after establishing the communication thereto for example.

Moreover, the GPIO terminal 420a is connected to one of terminals on the interface module 440, and then it is used for transmitting a signal detection (SD)/LOSS signal for notifying to the LAN switch 60 whether a communication is established or not between the OLT 11 and the ONU 400.

Further, it is able to design a configuration for the second MAC unit 422, for example, to have an MAC function of the Ethernet (the registered trade name) of 10 Mbps, 100 Mbps and 1 Gbps, and to comprise a ten bit interface (TBI) part 422a as a parallel interface. Still further, the TBI part 422a is connected to the serial/parallel transform unit 430 via ten of the input wires 460a and ten of the output wires 460b.

Still further, the first MAC unit 421 performs a MAC process regarding the communication to between the OLT 11 at the central office, meanwhile, the second MAC unit 422 performs a MAC process regarding the communication to between the external node(s) 60. In FIG. 27, only the first MAC unit 421, the second MAC unit 422 and the management interface 423 are shown as simplifying the detailed configuration of the ONU 420 shown as one example in FIG. 29.

Still further, the external node 60 comprises an MSA interface slot 60a for the MSA interface module 440 to be pluggable thereinto, and then it is connected with an MAC unit in the external node 60 inside (referred to as an external node MAC unit hereinafter) 61. Furthermore, the external node MAC unit 61 performs a MAC process regarding the communication to between the second MAC unit 422 in the ONU 400 inside.

Here, FIG. 26 is a diagrammatic perspective view of the ONU 400 according to the present embodiment, wherein the optical transceiver unit 410, the ONU function part 420 and the serial/parallel transform unit 430 are built in a package 480. Moreover, the ONU function part 420 and the serial/parallel transform unit 430 are mounted on a first substrate 491, meanwhile, the optical transceiver unit 410 is mounted on a second substrate 492. Further, the first substrate 491 and the second substrate 492 are electrically connected therebetween using a connector for connection between boards 493.

Still further, the ONU 400 according to the present embodiment is comprised of the first substrate 491 and the second substrate 492 as two sheets of the substrates. However, it is not limited thereto, and it may be also comprised of one sheet of substrate, or it may be comprised of not less than three sheets of substrates as well.

Figure 30:
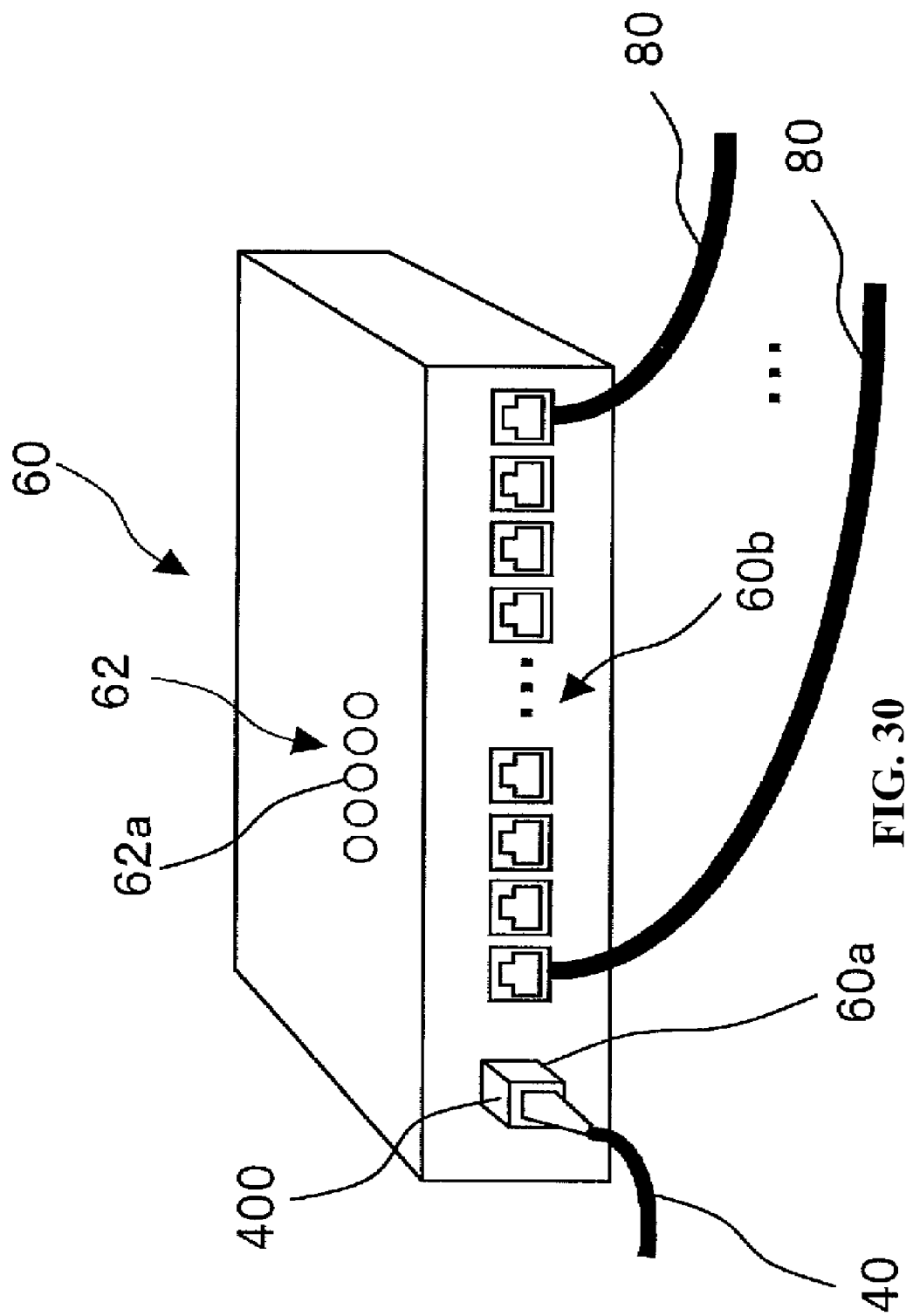
FIG. 30 is a diagrammatic perspective view showing one example of a customer premises optical network unit according to the third embodiment to be inserted into an MSA interface slot of an external node.

Still further, the package 480 is comprised of an insertion part 481 to be inserted into an inside of the MSA interface slot 60a of the external node 60, and of an exposed part 482 to be exposed to an outside of the MSA interface slot 60a. Furthermore, for the exposed part 482, the optical connector 411 is provided thereat for connecting the optical fiber 40. Here, One example that the ONU 400 is inserted into the MSA interface slot 60a of the external node 60 is shown in FIG. 30.

Regarding the OLT 11 at the central office, at a time of connecting with the ONU 400, a signal is exchanged to between the first MAC unit 421 for determining whether or not a predetermined condition is satisfied. And then an establishment of a data link is determined as normal in a case where it is satisfactory. In such the case thereof, a PON link becomes to be an established state between the OLT 11 and the ONU 400. Moreover, the establishment of the PON link corresponds to the link establishment of the L2 layer based on the OSI reference model.

Next, the management interface 423 confirms three conditions of an optical signal detection, a PON link and an authentication as communication conditions, and then it determines that the communication conditions are established when the establishments of such the three conditions are confirmed completely. More specifically, the confirmation of the optical signal detection is to confirm that the optical signal from the OLT 11 is detected. Regarding the PON link, it is determined that the PON link is established when the predetermined signal exchange is performed between the OLT 11 and the first MAC unit 421 as described above and then the predetermined condition becomes satisfactory. While, the confirmation of the authentication is performed at the authentication function part 12 after the establishment of the PON link. For identifying a connected party for the ONU 400, such the authentication function part 12 accesses to the ONU 400 and obtains a data of an authentication mode that the first MAC unit 421 stores, and then based thereon, the authentication is established when it becomes able to identify the connected party for the ONU 400.

Moreover, when the establishment of the above mentioned there communication conditions is confirmed, an IDLE data is transmitted from the second MAC unit 422 to the external node MAC unit 61, and also the GPIO signal 423a is output from the management interface 423 to the external node MAC unit 61 via the GPIO terminal 420a. Such the GPIO signal 423a is used as the SD/LOSS signal at the external node MAC unit 61. Further, at the external node 60, the external node MAC unit 61 determines that the communication to between the OLT 11 at the central office becomes established, when it confirms the following two points of receiving the IDLE data from the second MAC unit 422 of the ONU 400, and of becoming the SD/LOSS signal to be the communication established state.

Still further, there is provided an indication unit at the external node 60 for notifying such as a power supply state, the communication state, or the like. As one example, an LED 62 is provided at the external node 60 as shown in FIG. 30. For one of such the LEDs 62, an LED 62a is provided for notifying the establishment of the communication to between the OLT 11, and then it becomes turned on when it is determined at the external node MAC unit 61 as above mentioned that the communication to between the OLT 11 becomes to be established.

Thus, the LED 62a provided at the external node 60 is turned on only at a time as above mentioned when the external node MAC unit 61 receives the IDLE data from the second MAC unit 422 and the SD/LOSS signal (the GPIO signal 423a) becomes the communication established state. Therefore, the LED 62a is not turned on in the case where either one of the above mentioned conditions is not established, and then it is not able to determine which condition is not established. In particular, a signal of the PON link is an information of the L2 layer, and there is no method to transmit from the ONU 400 to the external node 60.

Figure 31:
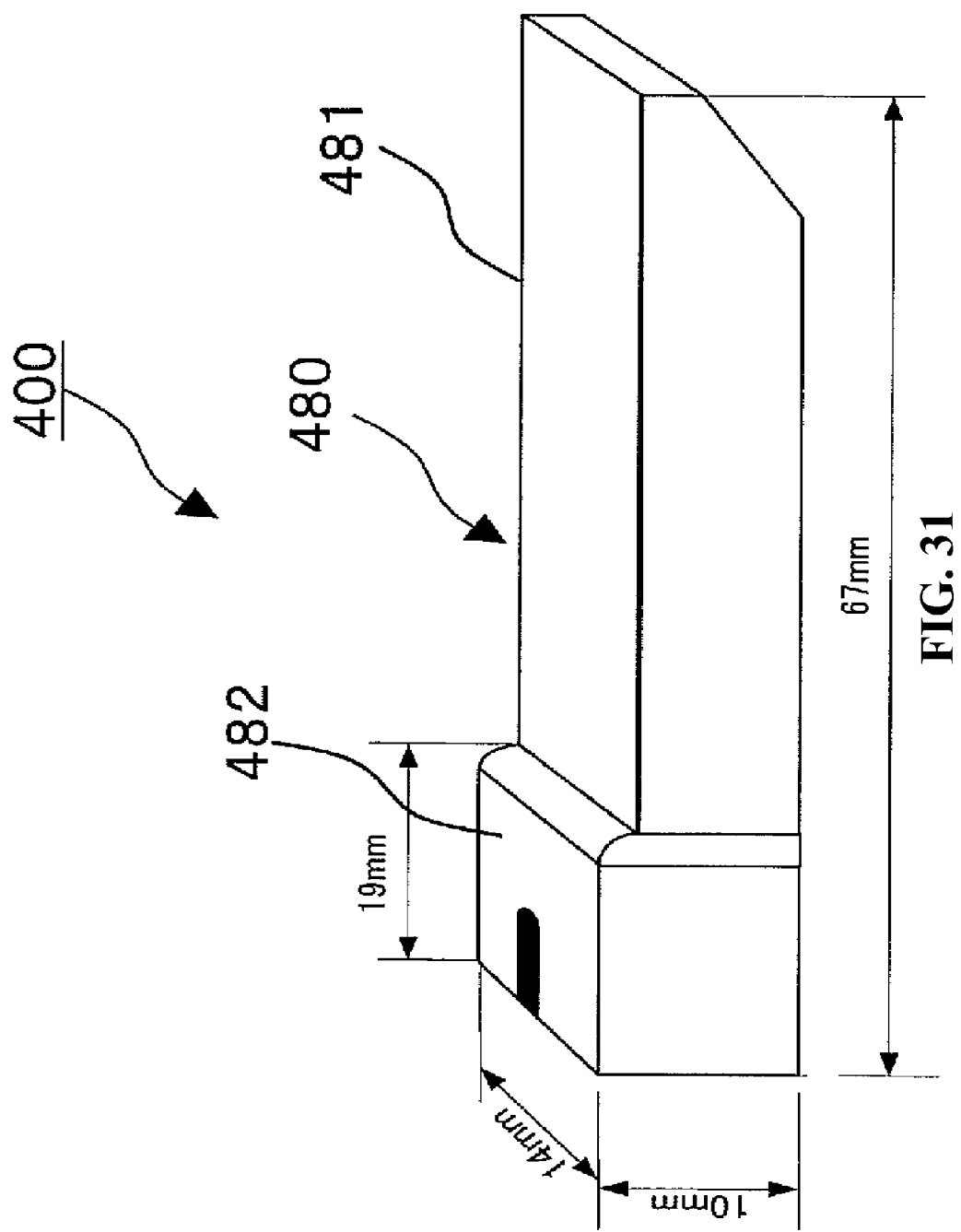
FIG. 31 is a diagrammatic perspective view showing one example of a dimension regarding a customer premises optical network unit according to the third embodiment.

On the contrary, for the ONU 400 according to the present embodiment, there is provided an indication unit at itself. In a case of an ONU having a relatively larger package, such as a desk top type, it is easy to provide an LED as the indication unit. However, the ONU 400 according to the present embodiment is the SFP standard type which is to be used by being inserted directly into the MSA interface slot 60a. And then it becomes to have an extremely smaller sized package comparing to the ONU of desk top type. Here, one example of a dimension regarding the ONU 400 is shown in FIG. 31.

In a case of providing the indication unit at the package 480, it is quite difficult to install such as an LED or the like at an outer surface of the package 480, from a point of view of an installation space, a wiring, or the like. Hence, conventionally it is not performed to install any indication units for the ONU of the SFP standard. On the contrary, according to the present embodiment, the LED is installed at the inside of the package 480, and then it is designed to be able to confirm from the outside thereof. That is to say, a visual check part is provided at the exposed part 482 for confirming the LED at the inside thereof. According to the ONU 400 as shown in FIG. 26, LEDs 494a and 494b as the indication units are provided at an inside of the package 480, and then light pass ditches 495a and 495b are formed as the visual check parts at an inner wall of the package 480.

Moreover, the LEDs 494a and 494b are installed on the first substrate 491 on which the ONU function part 420 is mounted for determining the communication condition, and then that are designed to be turned on/off in response to an indication request signal from the ONU function part 420. A further preferred installation position for the LEDs 494a and 494b is the position as close as possible to the inner wall of a tip part for the exposed part 482 side on the first substrate 491. By installing the LEDs 494a and 494b on the first substrate 491 as similar to that for the ONU function part 420, it becomes able to form easily the transmission path for the indication request signal from the ONU function part 420 to the LEDs 494a and 494b.

Here, it may be also available to provide the LEDs 494a and 494b at another substrate (the second substrate 492 in FIG. 26 for example) different from the first substrate 491 on which the ONU function part 420 is mounted. In a case of providing those onto the second substrate 492, an indication request signal is transmitted from the ONU function part 420 to the LEDs 494a and 494b via the connector for connection between boards 493.

Moreover, the light pass ditches 495a and 495b are formed at an inner wall of the exposed part 482 of the package 480, for being able to confirm the LEDs 494a and 494b from the optical connector 411 side. The positions to form the light pass ditches 495a and 495b are the positions that tip parts thereof become to be as close as possible to the LEDs 494a and 494b. Thus, it becomes able to confirm easily whether the LEDs 494a and 494b are turned on from the light pass ditches 495a and 495b even in a case of a state that the optical fiber 40 is connected with the optical connector 411.

Further, it becomes able to use two of the LEDs 494a and 494b for indicating states of different communication conditions respectively. For example, it is able to use the LED 494a for a state indication of the optical signal detection, meanwhile, it is able to use the LED 494b for a state indication of the PON link. And then it becomes able to confirm that the optical signal detection is established when the LED 494a is turned on, and that the PON link is established when the LED 494b is turned on. Furthermore, regarding a case where the authentication is confirmed and then the communication is established, it becomes able to confirm according to the LED 62a provided at the external node 60 also becoming to be turned on in addition to the LEDs 494a and 494b being turned on.

Here, according to the ONU 400 regarding the present embodiment, two of the LEDs 494a and 494b are provided as the indication units, and then the light pass ditches 495a and 495b are provided for each thereof. However, the LEDs as the indication units are not always required to be as two, and it may be available to design as one for being able to confirm only the PON link. Or, it is also able to design to provide three of LEDs for indicating a confirmation state of the authentication as well. For either case thereof, it is desirable that any LED as the indication unit is provided at the inside of the package 480, and then a light pass ditch is provided therefor respectively, for being able to confirm from an outside thereof whether each thereof is turned on.

The Fourth Embodiment

Figure 32:
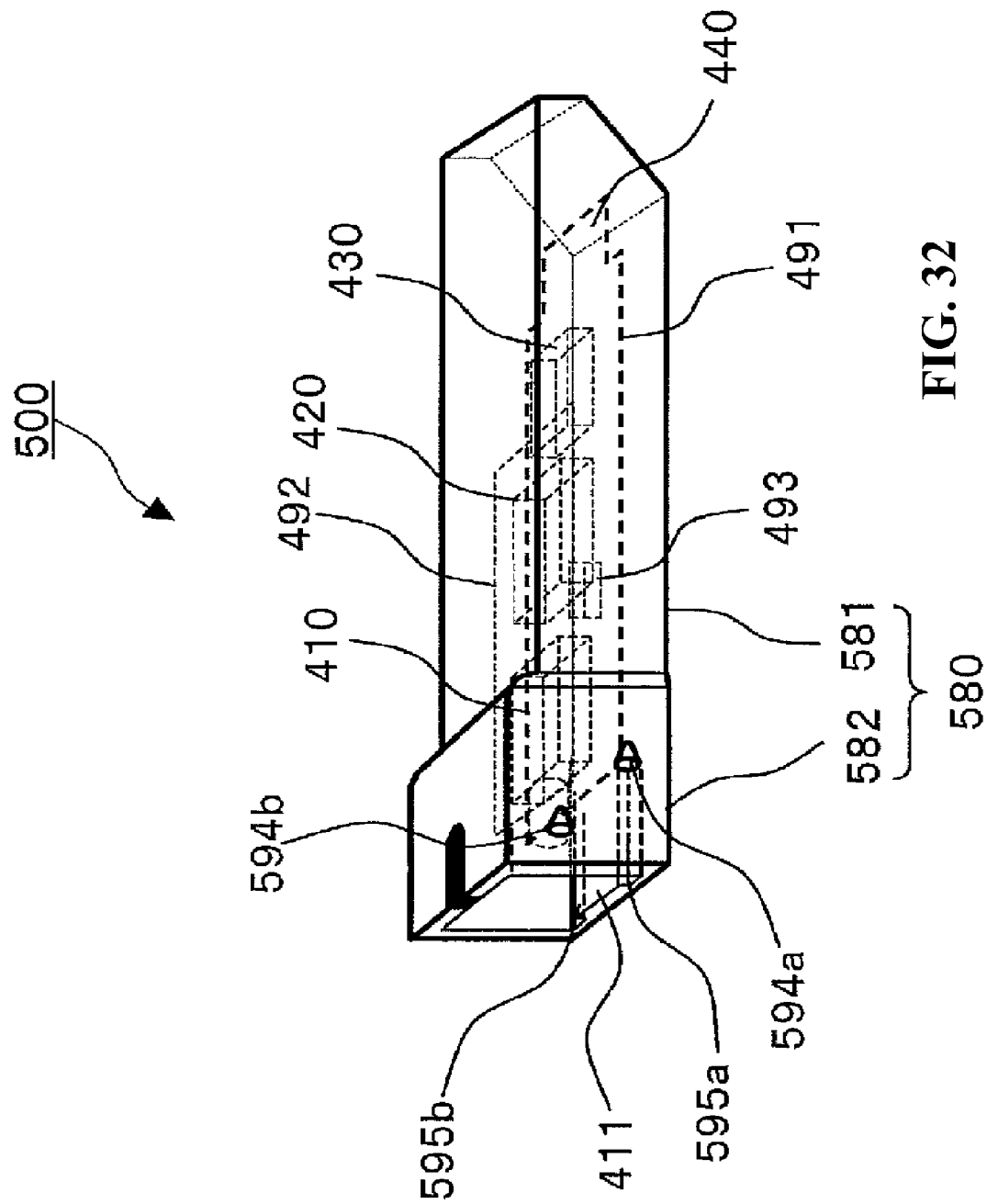
FIG. 32 is a diagrammatic perspective view showing an overview of a customer premises optical network unit according to the fourth embodiment.

A customer premises optical network unit according to the fourth embodiment regarding the present invention will be described in detail below with using FIG. 32. FIG. 32 is a diagrammatic perspective view showing an overview of a customer premises optical network unit 500 according to the present embodiment. According to the present embodiment, LEDs 594a and 594b are installed at an inside of a package 580 as well, and then it is designed for being able to confirm such the LEDs from an outside thereof. Moreover, according to the present embodiment, as visual check parts for confirming the LEDs 594a and 594b from the optical connector 411 side, light pass ditches 595a and 595b are formed at lower side corner parts of an inner wall of an exposed part 582.

Because the light pass ditches 595a and 595b are formed at the lower side corner parts of the inner wall of the exposed part 582, it is desirable to arrange the LEDs 594a and 594b at positions as close as possible to individual tip parts of the light pass ditches 595a and 595b. According to the present embodiment, as the positions as close as possible to the individual tip parts of the light pass ditches 595a and 595b, the LEDs 594a and 594b are installed at a rear side surface of the first substrate 491. As a result, the LEDs 594a and 594b become to be positioned as close to the inner wall at the lower side of the exposed part 582. Thus, by installing the LEDs 594a, 594b and the light pass ditches 595a, 595b in such the way as mentioned above, it becomes able to confirm easily whether the LEDs 594a and 594b are turned on from the light pass ditches 595a and 595b, even in the case of the state that the optical fiber 40 is connected with the optical connector 411.

The Fifth Embodiment

Figure 33:
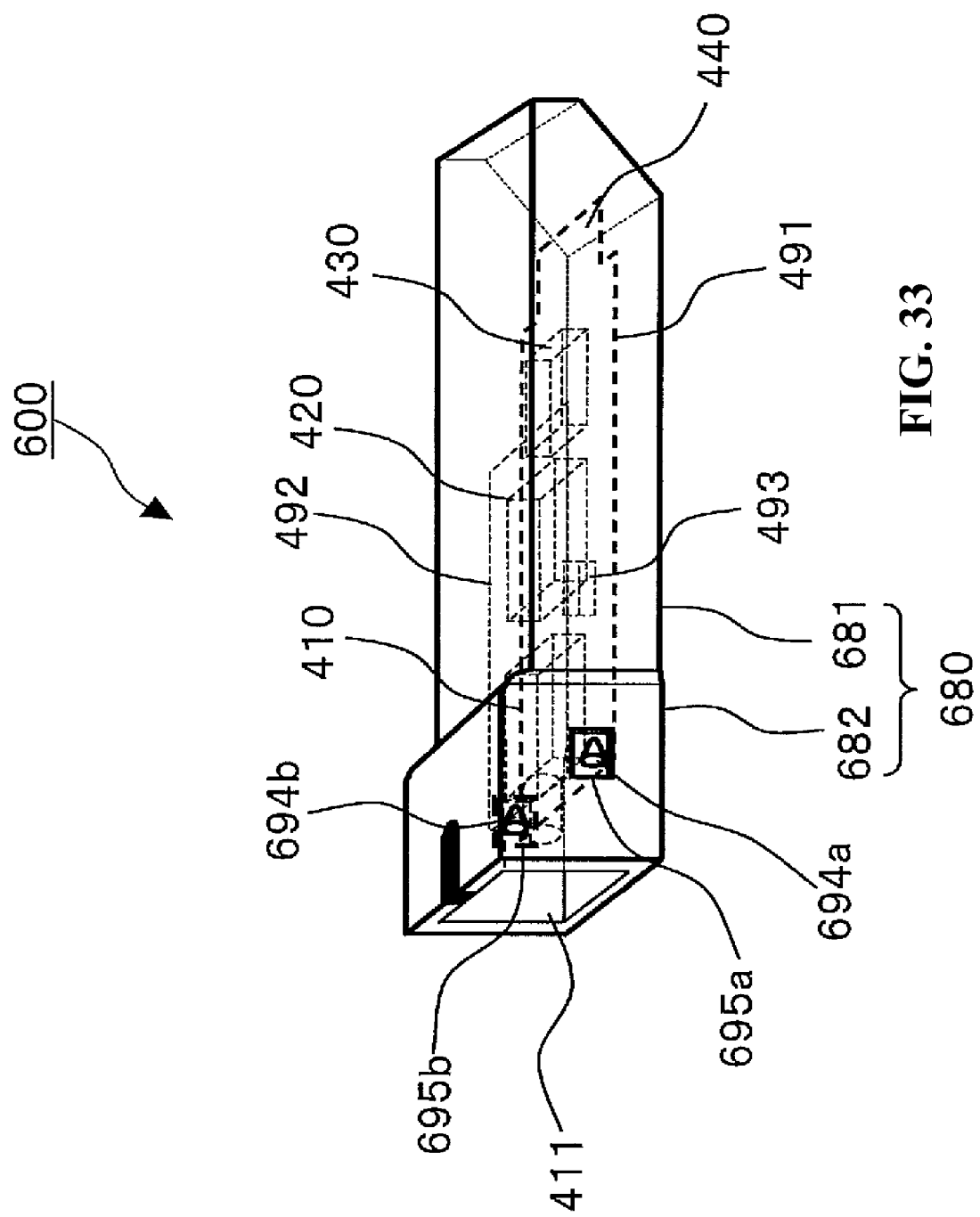
FIG. 33 is a diagrammatic perspective view showing an overview of a customer premises optical network unit according to the fifth embodiment.

A customer premises optical network unit according to the fifth embodiment regarding the present invention will be described in detail below with using FIG. 33. FIG. 33 is a diagrammatic perspective view showing an overview of a customer premises optical network unit 600 according to the present embodiment. According to the present embodiment, LEDs 694a and 694b are installed at an inside of a package 680 as well, and then it is designed for being able to confirm such the LEDs from an outside thereof. Moreover, the LEDs 694a and 694b are installed on the first substrate 491 as similar to that for the ONU function part 420, as same as the third embodiment. And then as further preferred installation positions therefor, it is desirable to design the positions as close as possible to an inner wall of an exposed part 682.

Furthermore, according to the present embodiment, as visual check parts for confirming the LEDs 694a and 694b, through holes 695a and 695b are formed at a side wall of the exposed part 682. It is desirable to install such the through holes 695a and 695b so that tip parts thereof becomes to be as close as possible to the LEDs 694a and 694b. Thus, by installing the through holes 695a and 695b at the side wall of the exposed part 682, it becomes able to confirm easily whether the LEDs 694a and 694b are turned on from the side wall side of the ONU 600 via the through holes 695a and 695b.

The Sixth Embodiment

Figure 34:
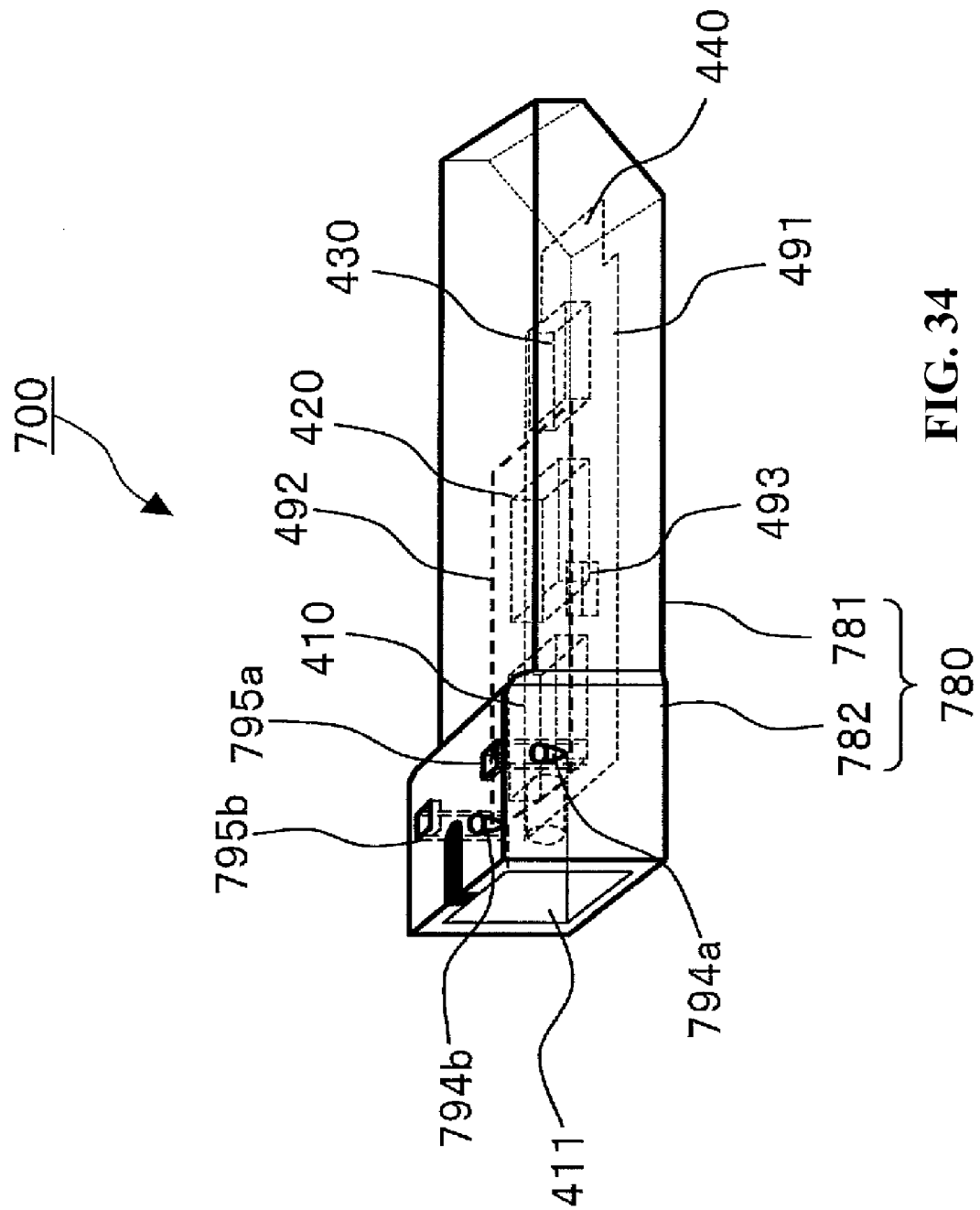
FIG. 34 is a diagrammatic perspective view showing an overview of a customer premises optical network unit according to the sixth embodiment.
Figure 35:
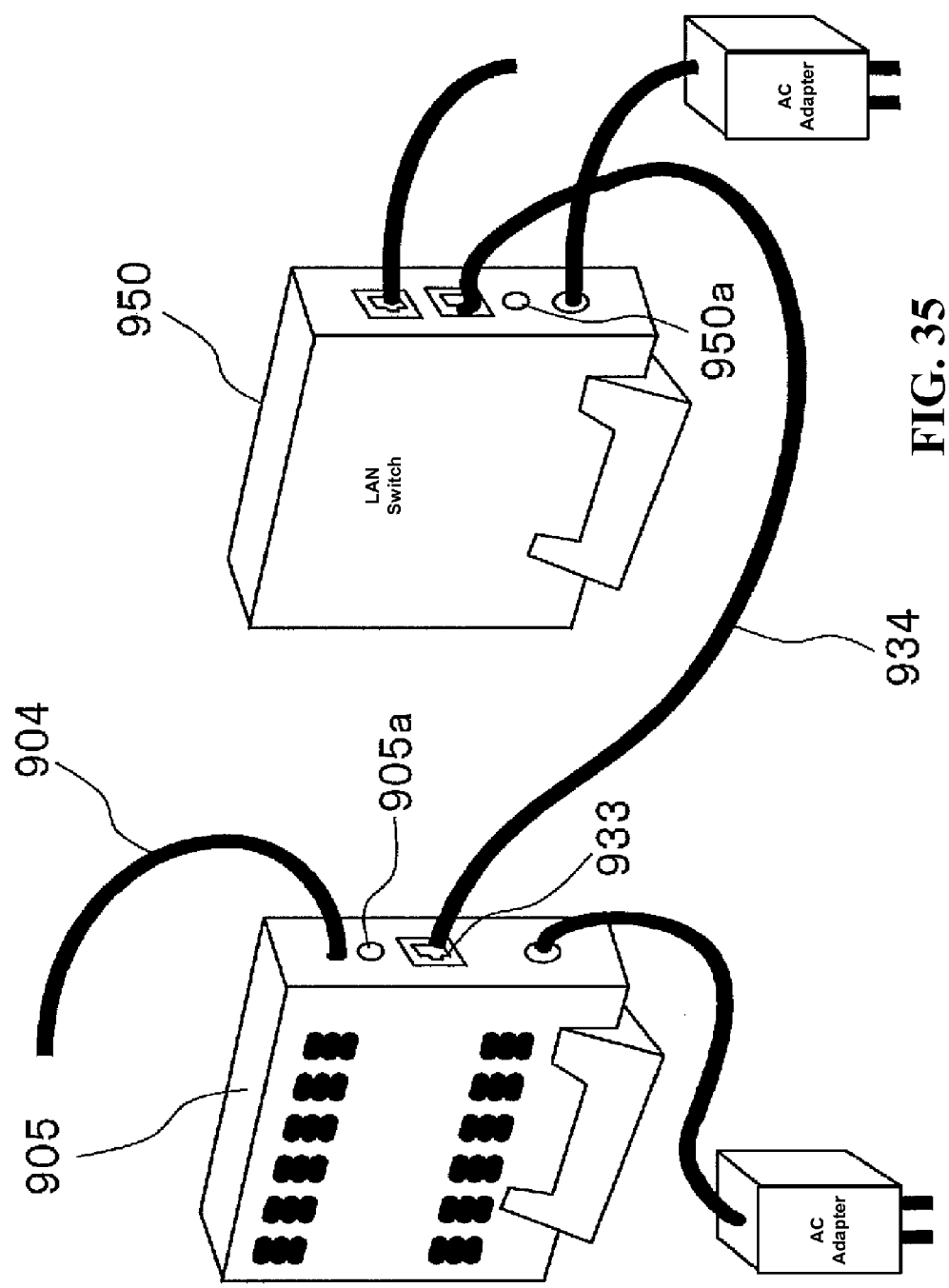
FIG. 35 is a diagrammatic perspective view of a conventional ONU and a conventional external node.

A customer premises optical network unit according to the sixth embodiment regarding the present invention will be described in detail below with using FIG. 34. FIG. 34 is a diagrammatic perspective view showing an overview of a customer premises optical network unit 700 according to the present embodiment. According to the present embodiment, LEDs 794a and 794b are installed on the second substrate 492 as different from the first substrate 491 on which the ONU function part 420 is mounted.

Moreover, according to the present embodiment, as visual check parts for confirming the LEDs 794a and 794b, through holes 795a and 795b are formed at an upper surface of an exposed part 782. It is desirable to install such the through holes 795a and 795b so that tip parts thereof become to be as close as possible to the LEDs 794a and 794b. And then according to the present embodiment, by installing the LEDs 794a and 794b on the second substrate 492 which is installed at an upper side of the first substrate 491, it becomes able to design the positions of such the LEDs to be as close as possible to the upper surface of the exposed part 782.

Thus, by installing the through holes 795a and 795b at the upper surface of the exposed part 782, it becomes able to confirm easily whether the LEDs 794a and 794b are turned on from the upper surface side of the ONU 700 via the through holes 795a and 795b.

According to the above mentioned third to the sixth embodiments, there is described the case where two of the LEDs are installed as the indication units. However, the number of the LEDs is not limited to two, and it may be available to be one as well, or it may be also available to be not less than three. Moreover, there is described the case where the LEDs are installed at the substrate which is closer than the other one to the visual check part. However, it is not limited thereto, and it may be also available to install the LEDs at the other substrate which is further from the visual check part. In either case thereof, it is desirable to install LEDs as the indication units at an inside of a package of an ONU, and then to install a visual check part at each of the LEDs, for being able to confirm whether each thereof is turned on from outside thereof. Thus, it becomes able to confirm easily a communication state between an OLT and the ONU, such as a PON link or the like.

Here, the description regarding each of the above mentioned embodiments is described for one example of the customer premises optical network unit and of the optical transmission system according to the present invention, and it is not limited thereto. Regarding a detailed configuration, a detailed operation, or the like, according to the customer premises optical network unit and the optical transmission system regarding the present embodiment, it is possible to modify properly without departing from the subject of the present invention.

What is claimed is:

1. A customer premises optical network unit comprising:
an optical transceiver unit to be connected with an optical transmission path at a central office side for performing an opto-electrical transform and an inverse opto-electrical transform;
an optical network unit function part to be connected with an electric signal input and output terminal of the optical transceiver unit comprising at least a communication logic unit for passive optical network (PON) processing;
a serial/parallel transform unit to be connected with a parallel signal terminal of the optical network unit function part for performing a serial/parallel transform and an inverse serial/parallel transform;
a multi source agreement interface module to be connected with a serial signal terminal of the serial/parallel transform unit; and
two or more sheets of substrate modules, respectively, comprising a connector for connection between the sheets of substrate modules,
wherein the two or more sheets of substrate modules are placed to overlap one another and connected electrically with the connector for connection between the sheets of substrate modules to each other, and
wherein the optical transceiver unit, the communication logic unit for PON processing, the serial/parallel transform unit, and the multi source agreement interface module are mounted on any one of the two or more sheets of substrate modules.

2. The customer premises optical network unit according to claim 1,
wherein the multi source agreement interface module is any one module of a giga bit interface converter, a small form factor pluggable and a small form factor pluggable plus.

3. The customer premises optical network unit according to claim 1,
wherein the optical transceiver unit comprises an optical sub-assembly wherein a main amplifier is built thereinto.

4. An optical transmission system comprising:
a customer premises optical network unit comprising:
an optical transceiver unit to be connected with an optical transmission path at a central office side for performing an opto-electrical transform and an inverse opto-electrical transform;
an optical network unit function part to be connected with an electric signal input and output terminal of the optical transceiver unit comprising at least a communication logic unit for passive optical network (PON) processing;
a serial/parallel transform unit to be connected with a parallel signal terminal of the optical network unit function part for performing a serial/parallel transform and an inverse serial/parallel transform;
a multi source agreement interface module to be connected with a serial signal terminal of the serial/parallel transform unit, and
two or more sheets of substrate modules, respectively, comprising a connector for connection between the sheets of substrate modules,
wherein the two or more sheets of substrate modules are placed to overlap one another and connected electrically with the connector for connection between the sheets of substrate modules to each other, and
wherein the optical transceiver unit, the communication logic unit for PON processing, the serial/parallel transform unit, and the multi source agreement interface module are mounted on any one of the two or more sheets of substrate modules,
an optical line terminal to be provided at a central office;
an optical multiplexing and de-multiplexing part comprising a port for a customer premises side and a port for the central office side;
a first optical transmission path for connecting between the customer premises optical network unit and the port for the customer premises side; and
a second optical transmission path for connecting between the optical line terminal and the port for the central office side.

5. The optical transmission system according to claim 4,
wherein said multi source agreement interface module is inserted directly into and connected with a multi source agreement interface slot of an external node arranged externally therefrom.

6. The optical transmission system according to claim 5,
wherein the external node is a local area network switch comprising a plurality of ports.

* * * * *